US011438115B2

(12) United States Patent
Rico Alvarino et al.

(10) Patent No.: US 11,438,115 B2
(45) Date of Patent: Sep. 6, 2022

(54) REFERENCE SIGNALS FOR NARROWBAND COMMUNICATIONS

(71) Applicant: QUALCOMM Incorporated, San Diego, CA (US)

(72) Inventors: Alberto Rico Alvarino, San Diego, CA (US); Ahmed Zaki, Bengaluru (IN); Ayan Sengupta, San Diego, CA (US); Le Liu, Fremont, CA (US); Umesh Phuyal, San Diego, CA (US); Prasad Reddy Kadiri, San Diego, CA (US); Vijayvaradharaj Tirucherai Muralidharan, Santa Clara, CA (US); Ravinder Kumar, Hyderabad (IN); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 16/992,846

(22) Filed: Aug. 13, 2020

(65) Prior Publication Data

US 2021/0050975 A1 Feb. 18, 2021

(30) Foreign Application Priority Data

Aug. 16, 2019 (IN) ............................ 201941033079

(51) Int. Cl.
*H04L 5/00* (2006.01)
*H04W 8/22* (2009.01)
(Continued)

(52) U.S. Cl.
CPC .............. *H04L 5/0048* (2013.01); *H04L 5/14* (2013.01); *H04W 8/22* (2013.01);
(Continued)

(58) Field of Classification Search
CPC ..... H04L 5/0048; H04L 5/005; H04L 5/0051; H04L 5/14; H04L 5/1438; H04L 5/1446;
(Continued)

(56) References Cited

U.S. PATENT DOCUMENTS

2009/0080569 A1* 3/2009 Han ...................... H04L 5/0092 375/316
2011/0111781 A1 5/2011 Chen et al.
(Continued)

FOREIGN PATENT DOCUMENTS

WO WO-2018063042 A1 4/2018
WO WO-2019096239 A1 5/2019

OTHER PUBLICATIONS

3GPP: "R1-1811372 Rel-15 NR UE Feature List", 3GPP Draft; R1-1811372 REL-15 NR UE Feature List, 3rd Generation Partnership Project (3GPP), Mobile Competence Centre; 650, Route Des Lucioles; F-06921, Sophia-Antipolis Cedex; France, Sep. 28, 2018 (Sep. 28, 2018), 38 Pages, XP051518776, Retrieved from the Internet: URL: http://www.3gpp.org/ftp/tsg%5Fran/WG1%5FRL1/TSGR1%5F94b/Docs/R1%2D1811372%2Ezip [retrieved on Sep. 28, 2019] p. 4.

(Continued)

*Primary Examiner* — Warner Wong
(74) *Attorney, Agent, or Firm* — Holland & Hart LLP

(57) ABSTRACT

Methods, systems, and devices for wireless communications are described to enable a base station to configure additional reference signals, which may be referred to as configured reference signals, to include in a transmission to a user equipment (UE). The UE may transmit a report to the base station, indicating a UE capability for supporting configured reference signals, and the base station may configure a pattern for the configured reference signals. The base station may transmit an indication of the pattern to the UE, where the indication may include one or more characteristics (Continued)

associated with the configured reference signals. The base station may transmit the configured reference signals to the UE according to the pattern, along with one or more baseline reference signals, within an associated transmission. The UE may use the configured reference signals and the baseline reference signals to receive a transmission from the base station.

29 Claims, 21 Drawing Sheets

(51) Int. Cl.
*H04L 5/14* (2006.01)
*H04W 72/04* (2009.01)
*H04W 76/10* (2018.01)

(52) U.S. Cl.
CPC ... *H04W 72/0446* (2013.01); *H04W 72/0453* (2013.01); *H04W 76/10* (2018.02)

(58) Field of Classification Search
CPC ............ H04L 5/1453; H04L 29/06326; H04L 29/06183; H04L 29/0619; H04L 65/10; H04L 65/1003; H04L 65/1069; H04L 2025/03783; H04L 2027/0083; H04L 27/061; H04W 8/22; H04W 8/24; H04W 72/04; H04W 72/044; H04W 72/0446; H04W 72/0453; H04W 76/00; H04W 76/10
See application file for complete search history.

(56) References Cited

U.S. PATENT DOCUMENTS

2012/0106493 A1* 5/2012 Noh ...................... H04L 5/0007
370/329
2014/0211695 A1* 7/2014 Cui ...................... H04L 5/0092
370/328
2015/0282126 A1* 10/2015 Park .................. H04W 72/0446
370/329
2016/0242170 A1 8/2016 Xu et al.
2018/0007707 A1 1/2018 Rico Alvarino et al.
2018/0054288 A1* 2/2018 Gelabert ............... H04W 72/04
2018/0191526 A1* 7/2018 Xu ...................... H04L 25/0224
2018/0287761 A1 10/2018 You et al.
2018/0367274 A1* 12/2018 Shi ........................ H04L 1/1614
2019/0082460 A1* 3/2019 Nam ..................... H04L 5/0091
2019/0098615 A1* 3/2019 Wang ................ H04W 72/0406
2019/0103942 A1* 4/2019 Wu ....................... H04L 5/0048
2019/0334751 A1* 10/2019 Liu ....................... H04L 1/1861
2020/0169441 A1 5/2020 Xu et al.
2020/0389284 A1* 12/2020 Manolakos ........... H04W 80/02
2021/0135789 A1* 5/2021 Wu ....................... H04L 27/261
2021/0152303 A1* 5/2021 Hao ..................... H04B 7/0456
2021/0250892 A1* 8/2021 Kim ...................... H04L 5/0051
2021/0281374 A1* 9/2021 Kim .......................... H04L 1/00
2022/0052814 A1* 2/2022 Yang .................. H04L 41/0803

OTHER PUBLICATIONS

Huawei, et al., "Evaluation Results of DMRS Design for DL Data Channel", 3GPP TSG RAN WG1 Meeting #90, 3GPP Draft; R1-1712244, 3rd Generation Partnership Project (3GPP), Mobile Competence Centre, 650, Route Des Lucioles, F-06921 Sophia-Antipolis Cedex, France, vol. RAN WG1, No. Prague, Czech Republic; Aug. 21, 2017-Aug. 25, 2017, Aug. 20, 2017 (Aug. 20, 2017), 17 Pages, XP051315061, Retrieved from the Internet: URL: http://www.3gpp.org/ftp/Meetings_3GPP_SYNC/RAN1/Docs/ [retrieved on Aug. 20, 2017] p. 2-p. 3, p. 5-p. 6, p. 9-p. 11.
International Search Report and Written Opinion—PCT/US2020/046313—ISA/EPO—dated Feb. 15, 2021 (194216WO).
QUALCOMM: "Remaining Issues on NR DM-RS", 3GPP TSGRAN WG1 Meeting #90, 3GPP Draft; R1-1715262, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 26, 2017 (Aug. 26, 2017), 25 Pages, XP051328137, Retrieved from the Internet: URL: http://www.3gpp.org/ftp/tsg_ran/WG1_RL1/TSGR1_90/Docs/retrieved on Aug. 26, 2017] section 1.10.
Partial International Search Report—PCT/US2020/046313—ISA/EPO—dated Nov. 9, 2020 (194216WO).

* cited by examiner

REFERENCE SIGNALS FOR NARROWBAND COMMUNICATIONS

CROSS REFERENCE

The present Application for Patent claims the benefit of India Provisional Patent Application No. 201941033079 by RICO ALVARINO et al., entitled "REFERENCE SIGNALS FOR NARROWBAND COMMUNICATIONS," filed Aug. 16, 2019, assigned to the assignee hereof, and expressly incorporated by reference herein.

TECHNICAL FIELD

The following relates generally to wireless communications and more specifically to reference signals for narrowband communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, an accuracy of a channel estimation performed by a UE may limit communications throughput or accuracy. For example, in communications regimes with a higher noise level or Doppler effect, a first number of subframes in a transmission, or a portion of a transmission following a frequency hop, may have an inaccurate channel estimation. Similarly, some transmissions or transmission portions preceding a transmission hop may also have an inaccurate channel estimation.

SUMMARY

The described techniques relate to improved methods, systems, devices, and apparatuses that support reference signals for narrowband communications. Generally, the described techniques provide for a base station to configure one or more additional reference signals (e.g., which may be referred to as configured or configurable reference signals) in one or more transmissions to a user equipment (UE), in order to improve a channel estimation at the UE. The UE may transmit a capability report to the base station, indicating a UE capability for supporting configured reference signals. The base station may configure a pattern for the one or more configured reference signals based on the capability report and may transmit an indication of the pattern to the UE. The indication may include one or more characteristics associated with the one or more configured reference signals, such as an on-off durations, power boosting values, scrambling sequences, rate matching or puncturing schemes, channel estimation associations, or the like. The base station may transmit the one or more configured reference signals to the UE according to the established configuration and/or pattern and may also transmit one or more baseline reference signals to the UE. The UE may receive the one or more configured reference signals based on the established configuration and/or pattern. The UE may use the one or more configured reference signals and the one or more baseline reference signals to receive transmissions from a base station and/or perform channel estimation. The one or more configured reference signals may increase an accuracy and a speed of the channel estimation and thus decrease communication latency.

The base station may transmit the one or more configured reference signals over a first number of subframes at a beginning of a transmission with a low signal to noise ratio (SNR) in order increase channel estimation speed or warm up channel estimation. In some cases, the one or more configured reference signals may follow an uplink transmission or an uplink transmission opportunity. Additionally or alternatively, the base station may transmit the one or more configured reference signals over a number of subframes at a beginning and end of a transmission to support interpolation for high-doppler transmissions. In some examples, the base station may transmit the one or more configured reference signals in a gap between uplink transmissions. The base station may also transmit the one or more configured reference signals using specific frequency resources.

A method of wireless communication at a UE is described. The method may include transmitting, to a base station, a capability report indicating a UE capability associated with a configurable reference signal pattern, receiving, from the base station, an indication of a configured reference signal pattern based on transmitting the capability report, receiving, from the base station, a first set of reference signals associated with a baseline reference signal pattern and a second set of reference signals associated with the configured reference signal pattern, and receiving, from the base station, a transmission based on the first set of reference signals and the second set of reference signals. The method may include performing a channel estimation based on the first set of reference signals and the second set of reference signals.

An apparatus for wireless communication at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to transmit, to a base station, a capability report indicating a UE capability associated with a configurable reference signal pattern, receive, from the base station, an indication of a configured reference signal pattern based on transmitting the capability report, receive, from the base station, a first set of reference signals associated with a baseline reference signal pattern and a second set of reference signals associated with the configured reference signal pattern, and receive, from the base station, a transmission based on the first set of reference signals and the second set of reference signals. The instructions may be executable by the processor to cause the apparatus to perform a channel estimation based on the first set of reference signals and the second set of reference signals.

Another apparatus for wireless communication at a UE is described. The apparatus may include means for transmitting, to a base station, a capability report indicating a UE capability associated with a configurable reference signal pattern, receiving, from the base station, an indication of a configured reference signal pattern based on transmitting the capability report, receiving, from the base station, a first set of reference signals associated with a baseline reference signal pattern and a second set of reference signals associated with the configured reference signal pattern, and receiving, from the base station, a transmission based on the first set of reference signals and the second set of reference signals. The apparatus may include means for performing a channel estimation based on the first set of reference signals and the second set of reference signals.

A non-transitory computer-readable medium storing code for wireless communication at a UE is described. The code may include instructions executable by a processor to transmit, to a base station, a capability report indicating a UE capability associated with a configurable reference signal pattern, receive, from the base station, an indication of a configured reference signal pattern based on transmitting the capability report, receive, from the base station, a first set of reference signals associated with a baseline reference signal pattern and a second set of reference signals associated with the configured reference signal pattern, and receive, from the base station, a transmission based on the first set of reference signals and the second set of reference signals. The code may include instructions executable by the processor to perform a channel estimation based on the first set of reference signals and the second set of reference signals.

Some examples of the method, apparatuses, and non-transitory computer-readable medium described herein may further include operations, features, means, or instructions for transmitting, to the base station, a request for the configured reference signal pattern, where receiving the indication of the configured reference signal pattern may be based on the request.

Some examples of the method, apparatuses, and non-transitory computer-readable medium described herein may further include operations, features, means, or instructions for determining that a downlink transmission associated with the first set of reference signals may be associated with one or more of a low SNR regime, a high doppler regime, or a frequency hop, where transmitting the request to the base station may be based on the determining.

Some examples of the method, apparatuses, and non-transitory computer-readable medium described herein may further include operations, features, means, or instructions for transmitting, to the base station, a channel report based on the first set of reference signals and the second set of reference signals.

Some examples of the method, apparatuses, and non-transitory computer-readable medium described herein may further include operations, features, means, or instructions for decoding the transmission from the base station based on a channel estimation based on the first set of reference signals and the second set of reference signals.

In some examples of the method, apparatuses, and non-transitory computer-readable medium described herein, the configured reference signal pattern may be based on a downlink transmission from the base station to the UE spanning one or more slots.

In some examples of the method, apparatuses, and non-transitory computer-readable medium described herein, the downlink transmission may be associated with a first frequency band different from a second frequency band associated with one or more previous downlink transmissions.

In some examples of the method, apparatuses, and non-transitory computer-readable medium described herein, the second set of reference signals may be configured to be received over a first number of slots at a beginning of the downlink transmission.

In some examples of the method, apparatuses, and non-transitory computer-readable medium described herein, the first number of slots follow an uplink transmission including an uplink report or a time-division duplexed transmission.

In some examples of the method, apparatuses, and non-transitory computer-readable medium described herein, the first number of slots follow a subframe reserved for uplink transmissions in a time-division duplexed frame structure.

In some examples of the method, apparatuses, and non-transitory computer-readable medium described herein, the second set of reference signals may be configured to be received over a first number of slots at a beginning of the downlink transmission and over a second number of slots at an end of the downlink transmission.

In some examples of the method, apparatuses, and non-transitory computer-readable medium described herein, a channel of the downlink transmission may be rate matched around the second set of reference signals.

In some examples of the method, apparatuses, and non-transitory computer-readable medium described herein, a channel of the downlink transmission may be punctured by the second set of reference signals.

In some examples of the method, apparatuses, and non-transitory computer-readable medium described herein, the channel of the downlink transmission may be rate matched by the first set of reference signals.

In some examples of the method, apparatuses, and non-transitory computer-readable medium described herein, the configured reference signal pattern may be based on a channel type associated with the downlink transmission.

In some examples of the method, apparatuses, and non-transitory computer-readable medium described herein, the configured reference signal pattern may be based on a transmission configuration of an uplink transmission spanning one or more slots, the second set of reference signals configured to be received during a gap in the uplink transmission.

In some examples of the method, apparatuses, and non-transitory computer-readable medium described herein, the second set of reference signals may be configured to be received over each resource block of a frequency band associated with a transmission assigned to the UE.

In some examples of the method, apparatuses, and non-transitory computer-readable medium described herein, the second set of reference signals may be configured to be received over resource blocks assigned to the UE.

In some examples of the method, apparatuses, and non-transitory computer-readable medium described herein, the second set of reference signals may be configured to be received over resource blocks between any two assigned resource blocks.

In some examples of the method, apparatuses, and non-transitory computer-readable medium described herein, the second set of reference signals may be configured to be received for every transmission of a channel assigned to the UE.

In some examples of the method, apparatuses, and non-transitory computer-readable medium described herein, the second set of reference signals may be configured to be received for every transmission of a channel scheduled from a UE-specific search space.

In some examples of the method, apparatuses, and non-transitory computer-readable medium described herein, the second set of reference signals may be configured to be received over a time period based on one or more of a modulation coding scheme, a number of repetitions of a channel, or a frequency hopping pattern.

Some examples of the method, apparatuses, and non-transitory computer-readable medium described herein may further include operations, features, means, or instructions for receiving, from the base station, downlink control information (DCI) indicating a pattern of the second set of reference signals, where the second set of reference signals may be configured to be received based on the pattern.

Some examples of the method, apparatuses, and non-transitory computer-readable medium described herein may further include operations, features, means, or instructions for receiving, from the base station, DCI including an indication that the second set of reference signals may be present.

In some examples of the method, apparatuses, and non-transitory computer-readable medium described herein, the second set of reference signals may be configured to may have an energy per resource element (EPRE) based on the configured reference signal pattern, may be dynamically configured to may have an EPRE based on signaling from the base station, or may be configured to may have a same EPRE as the first set of reference signals.

In some examples of the method, apparatuses, and non-transitory computer-readable medium described herein, the second set of reference signals may be configured to may have a same sequence as the first set of reference signals or a different sequence from the first set of reference signals.

In some examples of the method, apparatuses, and non-transitory computer-readable medium described herein, the second set of reference signals may be configured to be received over all antenna ports associated with the first set of reference signals or a subset of the antenna ports associated with the first set of reference signals.

In some examples of the method, apparatuses, and non-transitory computer-readable medium described herein, performing the channel estimation further may include operations, features, means, or instructions for using the second set of reference signals to determine a reference signal received power (RSRP) or a reference signal received quality (RSRQ).

Some examples of the method, apparatuses, and non-transitory computer-readable medium described herein may further include operations, features, means, or instructions for receiving, from the base station, an indication that the second set of reference signals may be disassociated with determining a RSRP or a RSRQ.

In some examples of the method, apparatuses, and non-transitory computer-readable medium described herein, the second set of reference signals includes one or more of cell-specific reference signals (CRSs), demodulation reference signals (DMRSs), or reference signals transmitted over ports associated with CRSs.

In some examples of the method, apparatuses, and non-transitory computer-readable medium described herein, the configured reference signal pattern may be based on one or more reference signals associated with a system information block in a same frequency band as the second set of reference signals.

In some examples of the method, apparatuses, and non-transitory computer-readable medium described herein, the second set of reference signals may be configured to puncture a downlink channel or be dropped by the UE if the second set of reference signals collide with one or more transmissions of the downlink channel.

In some examples of the method, apparatuses, and non-transitory computer-readable medium described herein, a downlink channel may be configured to puncture the second set of reference signals or be dropped by the UE if the second set of reference signals collide with one or more transmissions of the downlink channel.

Some examples of the method, apparatuses, and non-transitory computer-readable medium described herein may further include operations, features, means, or instructions for receiving, from the base station, the indication of the configured reference signal pattern via one or more of radio resource control (RRC) signaling, a medium access control (MAC) control element (CE), or DCI.

A method of wireless communication at a base station is described. The method may include receiving, from a UE, a capability report indicating a UE capability associated with a configurable reference signal pattern, transmitting, to the UE, an indication of a configured reference signal pattern based on receiving the capability report, and transmitting, to the UE, a first set of reference signals associated with a baseline reference signal pattern and a second set of reference signals associated with the configured reference signal pattern.

An apparatus for wireless communication at a base station is described. The apparatus may include a processor, memory coupled (e.g., operatively, communicatively, functionally, electronically, electrically, etc.) with the processor, and instructions stored in the memory. The instructions may be executable by the processor to cause the apparatus to receive, from a UE, a capability report indicating a UE capability associated with a configurable reference signal pattern, transmit, to the UE, an indication of a configured reference signal pattern based on receiving the capability report, and transmit, to the UE, a first set of reference signals associated with a baseline reference signal pattern and a second set of reference signals associated with the configured reference signal pattern.

Another apparatus for wireless communication at a base station is described. The apparatus may include means for receiving, from a UE, a capability report indicating a UE capability associated with a configurable reference signal pattern, transmitting, to the UE, an indication of a configured reference signal pattern based on receiving the capability report, and transmitting, to the UE, a first set of reference signals associated with a baseline reference signal pattern and a second set of reference signals associated with the configured reference signal pattern.

A non-transitory computer-readable medium storing code for wireless communication at a base station is described. The code may include instructions executable by a processor to receive, from a UE, a capability report indicating a UE capability associated with a configurable reference signal pattern, transmit, to the UE, an indication of a configured reference signal pattern based on receiving the capability report, and transmit, to the UE, a first set of reference signals associated with a baseline reference signal pattern and a second set of reference signals associated with the configured reference signal pattern.

Some examples of the method, apparatuses, and non-transitory computer-readable medium described herein may further include operations, features, means, or instructions for identifying one or more network conditions including a low SNR regime, a high doppler regime, or a frequency hop associated with a downlink transmission to the UE, and determining the configured reference signal pattern based on one or more network conditions.

Some examples of the method, apparatuses, and non-transitory computer-readable medium described herein may further include operations, features, means, or instructions for receiving, from the UE, a request for the configured reference signal pattern, where transmitting the indication of the configured reference signal pattern may be based on the request.

Some examples of the method, apparatuses, and non-transitory computer-readable medium described herein may further include operations, features, means, or instructions for receiving, from the UE, a channel report based on transmitting the first set of reference signals and the second set of reference signals.

In some examples of the method, apparatuses, and non-transitory computer-readable medium described herein, the configured reference signal pattern may be based on a downlink transmission from the base station to the UE spanning one or more slots.

In some examples of the method, apparatuses, and non-transitory computer-readable medium described herein, the downlink transmission may be associated with a first frequency band different from a second frequency band associated with one or more previous downlink transmissions.

In some examples of the method, apparatuses, and non-transitory computer-readable medium described herein, the second set of reference signals may be configured to be transmitted over a first number of slots at a beginning of the downlink transmission.

In some examples of the method, apparatuses, and non-transitory computer-readable medium described herein, the first number of slots follow an uplink transmission including an uplink report or a time-division duplexed transmission.

In some examples of the method, apparatuses, and non-transitory computer-readable medium described herein, the first number of slots follow a subframe reserved for uplink transmissions in a time-division duplexed frame structure.

In some examples of the method, apparatuses, and non-transitory computer-readable medium described herein, the second set of reference signals may be configured to be transmitted over a first number of slots at a beginning of the downlink transmission and over a second number of slots at an end of the downlink transmission.

In some examples of the method, apparatuses, and non-transitory computer-readable medium described herein, a channel of the downlink transmission may be rate matched around the second set of reference signals.

In some examples of the method, apparatuses, and non-transitory computer-readable medium described herein, a channel of the downlink transmission may be punctured by the second set of reference signals.

In some examples of the method, apparatuses, and non-transitory computer-readable medium described herein, the channel of the downlink transmission may be rate matched by the first set of reference signals.

In some examples of the method, apparatuses, and non-transitory computer-readable medium described herein, the configured reference signal pattern may be based on a channel type associated with the downlink transmission.

In some examples of the method, apparatuses, and non-transitory computer-readable medium described herein, the configured reference signal pattern may be based on a transmission configuration of an uplink transmission spanning one or more slots, the second set of reference signals configured to be transmitted during a gap in the uplink transmission.

In some examples of the method, apparatuses, and non-transitory computer-readable medium described herein, the second set of reference signals may be configured to be transmitted over each resource block of a frequency band associated with a transmission assigned to the UE.

In some examples of the method, apparatuses, and non-transitory computer-readable medium described herein, the second set of reference signals may be configured to be transmitted over resource blocks assigned to the UE.

In some examples of the method, apparatuses, and non-transitory computer-readable medium described herein, the second set of reference signals may be configured to be transmitted over resource blocks between any two assigned resource blocks.

In some examples of the method, apparatuses, and non-transitory computer-readable medium described herein, the second set of reference signals may be configured to be transmitted for every transmission of a channel assigned to the UE.

In some examples of the method, apparatuses, and non-transitory computer-readable medium described herein, the second set of reference signals may be configured to be transmitted for every transmission of a channel scheduled from a UE-specific search space.

In some examples of the method, apparatuses, and non-transitory computer-readable medium described herein, the second set of reference signals may be configured to be transmitted over a time period based on one or more of a modulation coding scheme, a number of repetitions of a channel, or a frequency hopping pattern.

Some examples of the method, apparatuses, and non-transitory computer-readable medium described herein may further include operations, features, means, or instructions for transmitting, to the UE, DCI indicating a pattern of the second set of reference signals, where the second set of reference signals may be configured to be transmitted based on the pattern.

Some examples of the method, apparatuses, and non-transitory computer-readable medium described herein may further include operations, features, means, or instructions for transmitting, to the UE, DCI including an indication that the second set of reference signals may be present.

In some examples of the method, apparatuses, and non-transitory computer-readable medium described herein, the second set of reference signals may be configured to may have an EPRE based on the configured reference signal pattern, may be dynamically configured by the base station to may have an EPRE based on signaling from the base station, or may be configured to may have a same EPRE as the first set of reference signals.

In some examples of the method, apparatuses, and non-transitory computer-readable medium described herein, the second set of reference signals may be configured to may have a same sequence as the first set of reference signals or a different sequence from the first set of reference signals.

In some examples of the method, apparatuses, and non-transitory computer-readable medium described herein, the second set of reference signals may be configured to be transmitted over all antenna ports associated with the first set of reference signals or a subset of the antenna ports associated with the first set of reference signals.

In some examples of the method, apparatuses, and non-transitory computer-readable medium described herein, the second set of reference signals may be used to determine a RSRP or a RSRQ.

Some examples of the method, apparatuses, and non-transitory computer-readable medium described herein may further include operations, features, means, or instructions for transmitting, to the UE, an indication that the second set of reference signals may be disassociated with determining a RSRP or a RSRQ.

In some examples of the method, apparatuses, and non-transitory computer-readable medium described herein, the second set of reference signals includes one or more of CRSs, DMRSs, or reference signals transmitted over ports associated with CRSs.

In some examples of the method, apparatuses, and non-transitory computer-readable medium described herein, the configured reference signal pattern may be based on one or more reference signals associated with a system information block in a same frequency band as the second set of reference signals.

In some examples of the method, apparatuses, and non-transitory computer-readable medium described herein, the second set of reference signals may be configured to puncture a downlink channel or be dropped by the UE if the second set of reference signals collide with one or more transmissions of the downlink channel.

In some examples of the method, apparatuses, and non-transitory computer-readable medium described herein, a downlink channel may be configured to puncture the second set of reference signals or be dropped by the UE if the second set of reference signals collide with one or more transmissions of the downlink channel.

Some examples of the method, apparatuses, and non-transitory computer-readable medium described herein may further include operations, features, means, or instructions for transmitting, to the UE, the indication of the configured reference signal pattern via one or more of RRC signaling, a MAC CE, or DCI.

DETAILED DESCRIPTION

Figure 1:
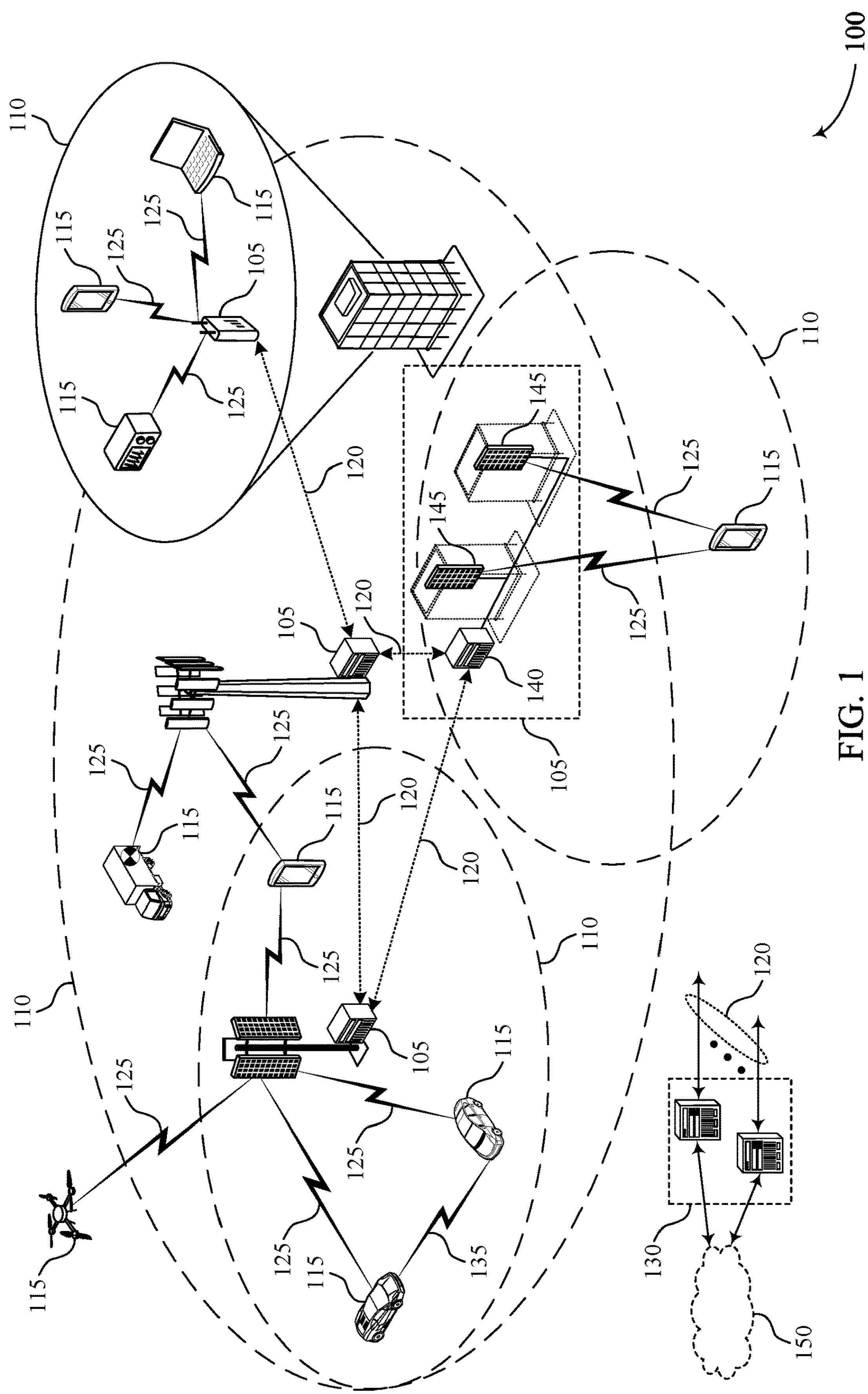
FIG. 1 illustrates an example of a wireless communications system that supports reference signals for narrowband communications in accordance with aspects of the present disclosure.

Transmissions between a base station and a user equipment (UE) may have an associated throughput and quality. In some wireless systems, transmission throughput and quality may be limited by channel estimation, which may be based on one or more reference signals. For example, a UE may compute an inaccurate channel estimate for a first number of subframes of a transmission with a low signal to noise ratio (SNR) due to limited filtering availability of one or more reference signal types. Additionally or alternatively, a UE may use reference signals from one or more subframes to interpolate when performing channel estimation for high-Doppler transmissions, but such interpolation may be invalid if a transmission carrying the reference signals changes frequency ranges (e.g., the UE performs frequency hopping). The UE may reset a channel estimation filter after frequency hopping, which may delay channel estimation.

Additional filtering opportunities or reference signal transmissions for a UE may improve accuracy and reduce delays when performing channel estimation for a transmission. As such, a base station may configure one or more additional reference signals (e.g., which may be referred to as configured or configurable reference signals) in one or more transmissions to a UE. The one or more configured reference signals may be based on one or more characteristics of a corresponding transmission (e.g., channel quality, frequency hopping, etc.). The base station may transmit the one or more configured reference signals to the UE in addition to one or more baseline reference signals associated with the transmission.

The base station may transmit the one or more configured reference signals over a first number of subframes at a beginning of a transmission with a low SNR in order to increase channel estimation speed or warm up channel estimation. In some cases, the one or more configured reference signals may follow an uplink transmission or an uplink transmission opportunity (e.g., within the transmission). Additionally or alternatively, the base station may transmit the one or more configured reference signals over a number of subframes at a beginning and end of a transmission to support interpolation for high-doppler transmissions. In some examples, the base station may transmit the one or more configured reference signals in a gap between uplink transmissions. The base station may also transmit the one or more configured reference signals using specific frequency resources. For example, the base station may transmit the one or more configured reference signals using all or portions of a frequency band (e.g., a narrowband) associated with the transmission.

The UE may transmit a capability report to the base station, indicating a UE capability for supporting configured reference signals. The base station may configure a pattern for the one or more additional reference signals (e.g., configured reference signals) based on the capability report and may transmit an indication of the pattern to the UE. The indication may include one or more characteristics associated with the one or more configured reference signals, such as on-off durations, power boosting values, scrambling sequences, rate matching or puncturing schemes, channel estimation associations, or the like. The base station may transmit the one or more configured reference signals to the UE according to the established configuration and/or pattern, and the UE may receive the one or more configured reference signals based on the established configuration and/or pattern. The UE may use the one or more configured reference signals, and the one or more baseline reference signals, to receive a transmission from a base station and/or perform channel estimation. By increasing the density of reference signals beyond a density of the baseline reference signal pattern, the one or more configured reference signals may increase an accuracy and a speed of the channel estimation and thus decrease communication latency.

Aspects of the disclosure are initially described in the context of wireless communications systems. Aspects of the disclosure are further illustrated by and described with reference to reference signal configurations, a process flow, apparatus diagrams, system diagrams, and flowcharts that relate to reference signals for narrowband communications.

FIG. 1 illustrates an example of a wireless communications system 100 that supports reference signals for narrowband communications in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, an MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc.), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like, which may be implemented in various articles such as appliances, drones, robots, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some wireless systems, transmission throughput and quality may be limited by channel estimation, which may be based on one or more reference signals. For example, a UE 115 may compute an inaccurate channel estimation for a first number of subframes of a transmission with a low SNR due to limited filtering availability of one or more reference signal types. Additionally or alternatively, a UE 115 may use reference signals from one or more subframes to interpolate when performing channel estimation for high-doppler transmissions, but such interpolation may be invalid if a transmission carrying the reference signals changes frequency ranges (e.g., the UE 115 performs frequency hopping). The UE 115 may also reset a channel estimation filter after frequency hopping, which may delay channel estimation.

Additional filtering opportunities or reference signal transmissions for a UE 115 may improve accuracy and reduce delays when performing channel estimation for a transmission. As such, a base station 105 may configure one or more additional reference signals (e.g., which may be referred to as configured reference signals) for one or more transmissions to a UE 115. The one or more configured reference signals may be based on one or more characteristics of a corresponding transmission (e.g., channel quality, frequency hopping, etc.). The base station 105 may transmit the one or more configured reference signals to the UE 115 in addition to one or more baseline reference signals associated with the transmission. The UE 115 may use the one or more configured reference signals and the one or more baseline reference signals to perform a channel estimation. The one or more configured reference signals may increase an accuracy and a speed of the channel estimation and thus decrease communication latency.

Figure 2:
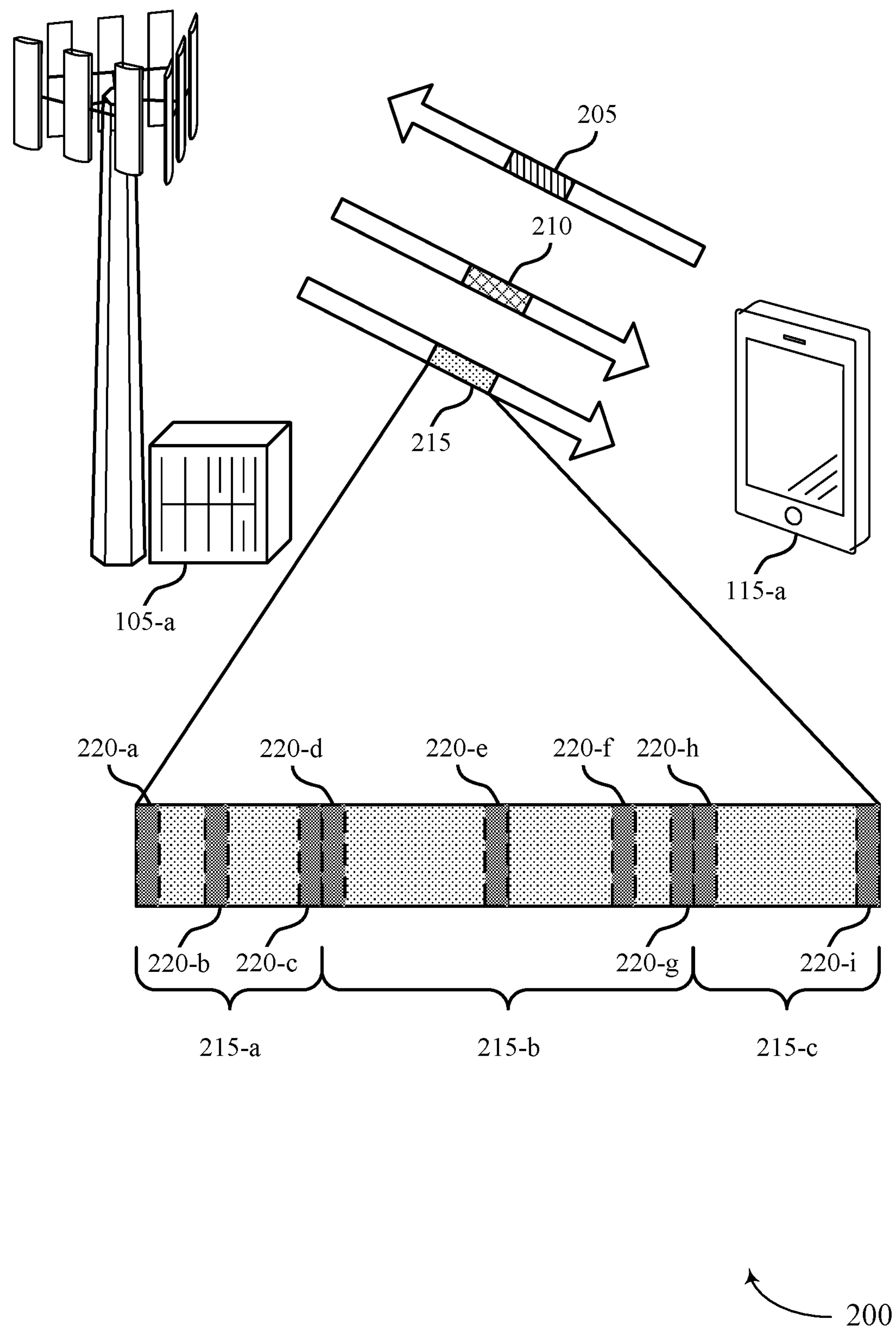
FIG. 2 illustrates an example of a wireless communications system that supports reference signals for narrowband communications in accordance with aspects of the present disclosure.

FIG. 2 illustrates an example of a wireless communications system 200 that supports reference signals for narrowband communications in accordance with aspects of the present disclosure. In some examples, wireless communications system 200 may implement aspects of wireless communications system 100. For example, wireless communications system 200 may include a base station 105-*a* and a UE 115-*a*, which may be examples of a base station 105 and a UE 115 described with reference to FIG. 1. In some cases, base station 105-*a* may transmit one or more reference signals to UE 115-*a*, where the reference signals may support channel estimation at UE 115-*a* for one or more associated downlink channels (e.g., physical downlink shared channel (PDSCH), MTC physical downlink control channel (MPDCCH), etc.). The one or more reference signals may be associated with a downlink transmission. As described herein, a transmission may refer to a portion of a transmission following a change in frequency (e.g., frequency hop) or may refer to a new transmission from base station 105-*a*.

In some wireless communications networks (e.g., an MTC or eMTC network), transmission throughput and quality may be limited by channel estimation (e.g., channel estimation based on one or more reference signals, such as cell-specific reference signals (CRSs)). For example, UE 115-*a* may compute an inaccurate channel estimation for a first number of subframes of a transmission with a low SNR due to limited filtering availability of one or more reference signal types. Additionally or alternatively, UE 115-*a* may use reference signals from one or more subframes to interpolate when performing channel estimation for high-doppler transmissions, but such interpolation may be invalid if a transmission carrying the reference signals changes frequency ranges (e.g., UE 115-*a* performs frequency hopping). In such cases, UE 115-*a* may reset a channel estimation filter after frequency hopping (e.g., by retuning a local oscillator), which may delay channel estimation of the transmission.

More filtering opportunities (e.g., reference signal transmissions) for UE 115-*a* may improve accuracy and reduce delays when performing channel estimation for a transmission. As such, base station 105-*a* may configure one or more additional reference signals (e.g., configured reference signals 220) for UE 115-*a*. The one or more configured reference signals 220 may be included in one or more transmissions 215 from base station 105-*a* to UE 115-*a* and the one or more configured reference signals 220 may be based on one or more characteristics of a corresponding transmission 215. Base station 105-*a* may transmit the one or more configured reference signals 220 to UE 115-*a* in addition to one or more baseline reference signals associated with the transmission.

Base station 105-*a* may transmit the one or more configured reference signals 220 over a first number of subframes at a beginning of a transmission 215 with a low SNR (e.g., in order to increase channel estimation speed or warm up channel estimation), as illustrated with respect to configured reference signals 220-*a*, 220-*d*, and 220-*h*. In some cases, the one or more configured reference signals 220 may follow an uplink transmission (e.g., a half-duplex transmission, TDD uplink transmission, etc.). In some cases, the uplink transmission may occur within a transmission 215 (e.g., for a half-duplex uplink transmission) and base station 105-*a* may transmit the one or more configured reference signals 220 within transmission 215, as illustrated with respect to configured reference signals 220-*b*, 220-*e*, and 220-*f*. Additionally or alternatively, base station 105-*a* may transmit the one or more configured reference signals 220 over a number of subframes at a beginning and end of a transmission 215 to support interpolation for high-doppler transmissions, as illustrated with respect to configured reference signals 220-*a*, 220-*c*, 220-*d*, 220-*g*, 220-*h*, and 220-*i*. In some examples, base station 105-*a* may transmit the one or more configured reference signals 220 in a gap between uplink transmissions.

The reference signal configurations associated with the one or more configured reference signals 220 are described in more detail with reference to FIGS. 3-6. Base station 105-*a* may also transmit the one or more configured reference signals 220 using specific frequency resources (e.g., specific resource blocks (RBs)), as described with reference to FIG. 7. For example, base station 105-*a* may transmit the one or more configured reference signals 220 using all or portions of a frequency band (e.g., a narrowband) associated with the transmission 215.

UE 115-*a* may transmit a capability report 205 to base station 105-*a*, indicating a UE capability for supporting configured reference signals 220. In some cases, capability report 205 may include separate capability indications for each of the reference signal configuration types supported by base station 105-*a* (e.g., reference signals at a beginning and/or end of a transmission 215, after an uplink transmission, in an uplink transmission gap, etc.). Base station 105-*a* may configure a pattern for the one or more additional reference signals (e.g., configured reference signals 220) based on the capability report 205 and may transmit an indication 210 of the pattern to UE 115-*a*. The signaling procedures used by base station 105-*a* to transmit indication 210 may be based on whether UE 115-*a* is operating in an idle mode or a connected mode.

In a first example, UE 115-*a* may operate in connected mode and base station 105-*a* may determine whether to enable or disable the one or more configured reference signals 220 based on one or more network conditions and may transmit indication 210 to UE 115-*a* based on the determination. The one or more network conditions may include an SNR level for one or more transmissions 215, a doppler value associated with one or more transmissions 215, or the like. In a second example, UE 115-*a* may operate in connected mode and may transmit a request for the one or more configured reference signals 220 to base station 105-*a*. Base station 105-*a* may receive the request and may transmit indication 210 to UE 115-*a*, indicating the pattern for the one or more configured reference signals 220. UE 115-*a* may include the request in an RRC message, such as a UE assistance information RRC message or a preference indication RRC message.

In a third example, UE 115-*a* may operate in an idle mode and base station 105-*a* may indicate the presence of the one or more configured reference signals 220 via broadcast RRC signaling that may be addressed to a radio network temporary identifier (RNTI) associated with UE 115-*a* (e.g., a random access RNTI (RA-RNTI), paging RNTI (P-RNTI), system information RNTI (SI-RNTI), etc.). In some cases, RA-RNTIs associated with different coverage levels may be associated with different reference signal configurations. Additionally or alternatively, RA-RNTIs associated with early data transmission (EDT) may be associated with different reference signal configurations than RA-RNTIs without EDT. In some cases, a downlink channel (e.g., PDSCH) associated with a P-RNTI having a number of repetitions above a threshold number may include the one or more configured reference signals 220, while other downlink channels may be transmitted without configured reference signals 220. A number of transmitted configured reference signals 220 may also be based on a number of repetitions of a P-RNTI.

In a single cell point-to-multipoint (SC-PTM) configuration, the one or more configured reference signals 220 may be associated with a control channel (e.g., multicast control channel (MCCH)) and may be indicated in a system information block (SIB). Similarly, the one or more configured reference signals 220 may be included in one or more data channels (e.g., multicast transmission channel (MTCH)) and may be indicated in a control channel (e.g. MCCH) associated with each data channel. In some cases, the one or more configured reference signals 220 may be configured separately for each data channel.

Once base station 105-*a* enables the one or more configured reference signals 220, the one or more configured reference signals 220 may follow an on-off pattern. In a first example of an on-off pattern, once the one or more configured reference signals 220 are enabled, base station 105-*a* may continue transmitting the one or more configured reference signals 220 for every transmission channel assigned to UE 115-*a*. In a second example, once the one or more configured reference signals 220 are enabled, base station 105-*a* may continue transmitting the one or more configured reference signals 220 for every transmission 215 of a channel scheduled from a UE-specific search space (USS), without transmitting the one or more configured reference signals 220 on transmissions 215 scheduled from a common search space (CSS). In a third example, the one or more configured reference signals 220 may be transmitted based on one or more characteristics of the associated transmission 215, such as an MCS, a number of transmission repetitions, a presence of a frequency hop, or the like. In a fourth example, base station 105-*a* may explicitly signal, via downlink control information (DCI), when the one or more configured references signals 220 are present, or may indicate a pattern of the one or more configured reference signals 220. The pattern may be indicated via a combination of RRC and DCI signaling. For example, four patterns may be configured via RRC signaling and the DCI may indicate one of the four patterns using two bits.

In some examples, one or more properties of the one or more configured reference signals 220 may be based on the DCI. For example, a repetition level, transport block size (TBS), or other parameter associated with the transmission 215 and indicated in the DCI may be indicative of a number of symbols associated with the one or more configured reference signals 220. In some cases, some transmission modes (e.g., a PDSCH associated with transmission mode 9) may not support the one or more configured reference signals 220 and, as such, base station 105-*a* may turn off the one or more configured reference signals 220.

In some cases, a power boost value may be configured for the one or more configured reference signals 220 (e.g., via the indication 210, via a standards body, etc.). In a first example, the one or more configured reference signals 220 may have a same energy per resource element (EPRE) as the one or more baseline reference signals. As such, a downlink channel (e.g., PDSCH) associated with the one or more configured reference signals 220 may have a same EPRE for symbols including the one or more baseline reference signals and for symbols including the one or more configured reference signals 220. In a second example, the one or more configured reference signals 220 may have a default or configured EPRE. For example, an EPRE for the one or more configured reference signals 220 may be 0 decibels (dB) for transmissions 215 associated with one antenna port or 3 dB for transmissions associated with two antenna ports. In a third example, base station 105-*a* may signal an EPRE for the one or more configured reference signals 220 to UE 115-*a* via indication 210, or via additional signaling. For example, base station 105-*a* may indicate a relative power of the one or more configured reference signals 220 compared to a downlink channel associated with the one or more transmissions 215. In some cases, base station 105-*a* may enable the one or more configured reference signals 220 if the relative power of the one or more configured reference signals 220 to the downlink channel is below a threshold (e.g., at or below 0 dB or 1 dB).

In some cases, a scrambling sequence may be configured for the one or more configured reference signals 220 (e.g., via the indication 210, via a standards body, etc.). For example, the one or more configured reference signals 220 may copy a same scrambling sequence form the one or more baseline reference signals, or may have a separate scrambling from the one or more baseline reference signals. Indication 210 may additionally or alternatively indicate antenna ports for the one or more configured reference signals 220. For example, the one or more configured reference signals 220 may be transmitted or received on all antenna ports or on a subset of antenna ports (e.g., ports 0 and 1) associated with the one or more baseline reference signals.

In some examples, radio resource management (RRM) characteristics may be associated with the one or more configured reference signals 220 (e.g., via the indication 210, via a standards body, etc.). For example, base station 105-*a* may indicate whether UE 115-*a* may determine reference signal received power (RSRP) or reference signal received quality (RSRQ) using the one or more configured reference signals 220 and the one or more baseline reference signals. Base station may similarly indicate for UE 115-*a* to determine RSRP or RSRQ without using the one or more configured reference signals 220 (e.g., using the one or more baseline signals). If base station 105-*a* indicates for UE 115-*a* to use the one or more configured reference signals 220 to determine RSRP or RSRQ, UE 115-*a* may employ a scaling factor to calculate RSRP or RSRQ if the EPRE of the one or more configured reference signals 220 is different from the EPRE of the one or more baseline reference signals.

In some cases, a rate matching or puncturing scheme may be configured for the one or more configured reference signals 220 (e.g., via the indication 210, via a standards body, etc.). In a first example, the associated transmission 215 (e.g., a channel of the transmission 215, such as a PDSCH) may be rate-matched around the one or more configured reference signals 220. If the one or more configured reference signals 220 overlap with a transmission associated with a different UE 115, the one or more configured reference signals 220 may puncture the transmission associated with the different UE 115. In a second example, the transmission 215 (e.g., a channel of the transmission 215, such as a PDSCH) may be punctured by the one or more configured reference signals 220. Base station 105-*a* or UE 115-*a* may select the first or second example of rate matching or puncturing schemes based on a coverage enhancement (CE) mode, a transmission type, a TBS, a number of configured reference signals 220, or the like. For example, base station 105-*a* may configure UE 115-*a* to rate match according to the first example for a CE mode A or for unicast data transmissions 215 (e.g., data associated with a cellular RNTI (C-RNTI)), and may configure UE 115-*a* to rate match according to the second example for a CE mode B or for broadcast and multicast data transmissions 215.

In some cases, characteristics of the one or more configured reference signals 220 may be based on a channel type of the associated transmission 215. For example, a number of symbols for the one or more configured reference signals 220, a reference signal type, a frequency domain allocation, or the like, may be different for an MPDCCH and a PDSCH. The one or more configured reference signals 220 may also be associated with a specific type of reference signal, such as a CRS or a demodulation reference signal (DMRS). In some cases, the one or more configured reference signals 220 may be associated with any type of reference signal that may be transmitted from a same port as the one or more baseline reference signals. For example, the one or more baseline reference signals may correspond to CRSs and may be transmitted over ports 0, 1, 2, or 3. In some cases, one channel type may be associated with a specific type of configured reference signal 220, such as a CRS or a DMRS. For example, a PDSCH may be associated with CRS for configured reference signals 220, while an MPDCCH may be associated with DMRS for configured reference signals 220. In some cases, an MPDCCH may be associated with CRS for configured reference signals 220 if UE 115-*a* supports CRS demodulation for MPDCCH.

In some examples, the one or more configured reference signals 220 may collide with other channels or signals at UE 115-*a* (e.g., channel state information reference signals (CSI-RS), wake up signals (WUSs), positioning reference signals (PRSs)). Accordingly, UE 115-*a* may drop the one or more configured reference signals 220 or may drop the other channel or signal. Additionally or alternatively, UE 115-*a* may puncture the other channel or signal with the one or more configured reference signals 220 or may puncture the one or more configured reference signals 220 with the other channel or signal. In some cases, a density of the one or more configured reference signals 220 may be based on whether a broadcast signal (e.g., an SIB) in a same frequency band includes one or more configured reference signals 220. For example, if an SIB includes one or more configured reference signals 220, the one or more configured reference signals 220 associated with the transmission 215 may have a lower density (e.g., because other configured reference signals 220 are available for UE 115-*a*).

Base station 105-*a* may transmit the one or more configured reference signals 220 to UE 115-*a* according to the established configuration and/or pattern, and UE 115-*a* may receive the one or more configured reference signals 220 and may use them to receive one or more transmissions from base station 105-*a* and/or perform channel estimation. In some cases, UE 115-*a* may transmit a channel report to base station 105-*a* based on the channel estimation. The configured reference signals 220 may increase an accuracy and a speed of the channel estimation at UE 115-*a* and thus decrease communication latency. In this way, the channel estimate based on the one or more configured reference signals 220 may also be used to improve decoding operations at the UE 115-*a*.

Figure 3A:
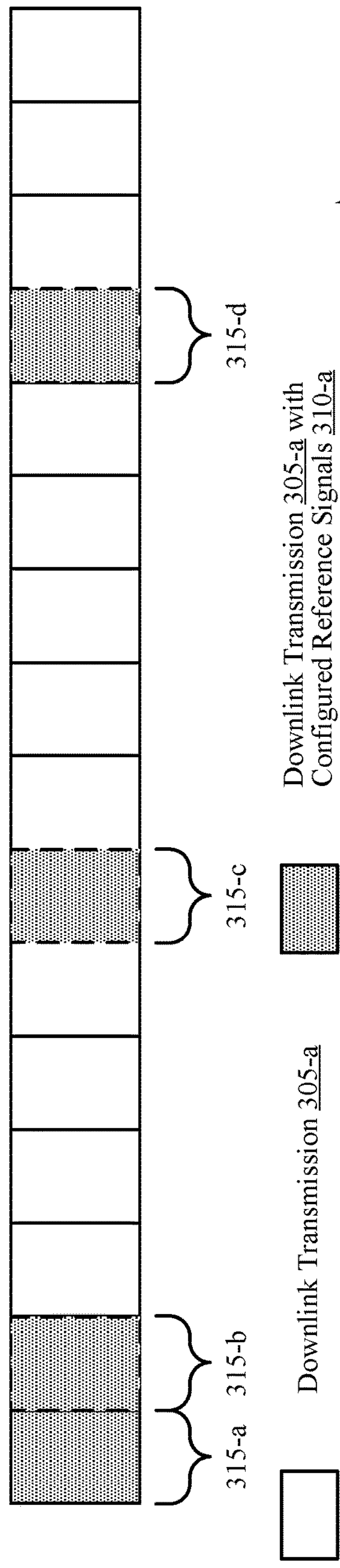
FIGS. 3A and 3B illustrate examples of reference signal configurations that support reference signals for narrowband communications in accordance with aspects of the present disclosure.
Figure 3B:
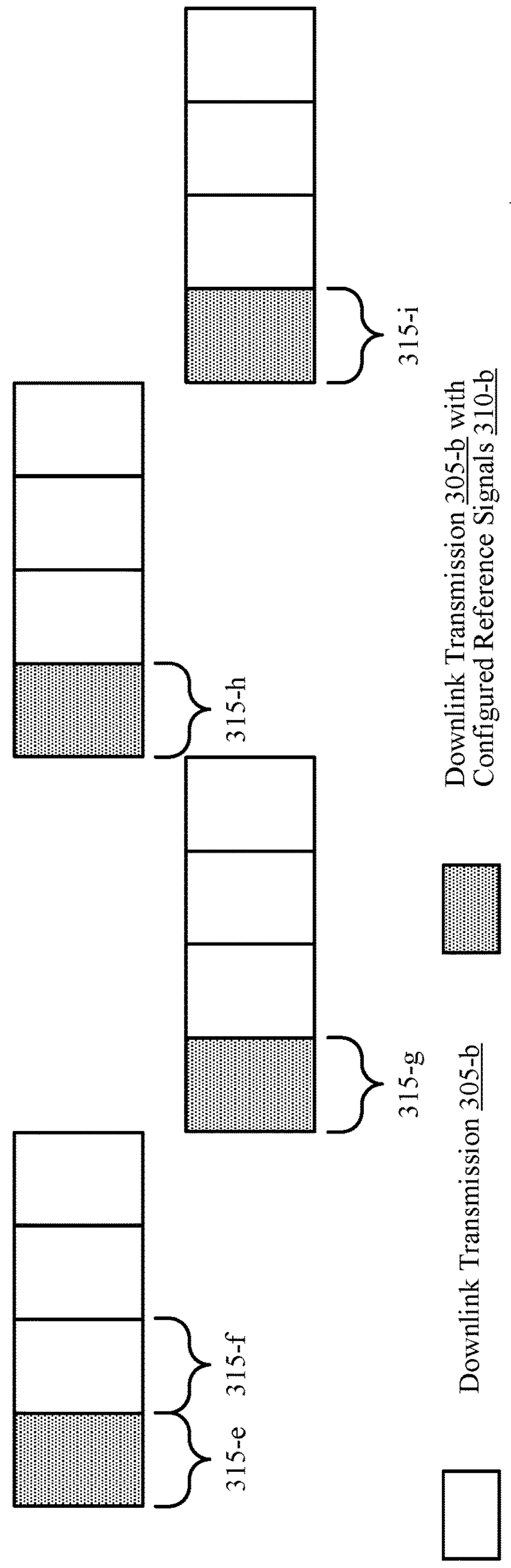

FIGS. 3A and 3B illustrate examples of reference signal configurations 301 and 302 that support reference signals for narrowband communications in accordance with aspects of the present disclosure. In some examples, reference signal configurations 301 and 302 may implement aspects of wireless communications systems 100 or 200. For example, reference signal configurations 301 and 302 may represent a configuration for additional reference signals (e.g., configured reference signals) transmitted from a base station 105 to a UE 115, which may be examples of a base station 105 and a UE 115 described with reference to FIGS. 1 and 2. Reference signal configuration 301 may illustrate an example of a downlink transmission 305-*a* associated with one or more configured reference signals 310-*a*, where the downlink transmission 305-*a* is transmitted without frequency hopping. Reference signal configuration 302 may illustrate an example of a downlink transmission 305-*b* associated with one or more configured reference signals 310-*b*, where the downlink transmission 305-*b* is transmitted with frequency hopping. As described with reference to FIG. 2, the base station 105 may configure the UE 115 with reference signal configuration 301 or 302 such that the UE 115 may receive the one or more configured reference signals.

Reference signal configurations 301 and 302 may be associated with low SNR transmission regimes (e.g., which may also be low doppler regimes). In some cases, the base station 105 may identify that a low SNR regime exists for a downlink transmission 305 and may implement reference signal configuration 301 or 302. Additionally or alternatively, the UE 115 may identify that a low SNR regime exists for a downlink transmission 305 and may transmit a request for reference signal configuration 301 or 302 to the base station 105. The base station 105 may transmit the one or more configured reference signals 310 over a first number of subframes 315 at a beginning of the downlink transmission 305 (e.g., or at a beginning of a portion of the downlink transmission 305), where the one or more configured reference signals 310 may increase channel estimation speed and warm up channel estimation.

In a first example, the one or more configured reference signals 310 may be added to a first number of subframes 315 (e.g., a first N subframes 315) of a downlink transmission 305 (e.g., or a transmission portion following a hop). In the example of reference signal configuration 301, the one or more configured reference signals 310 may be added to subframe 315-*a*, or to subframes 315-*a* and 315-*b*, at the beginning of the downlink transmission 305-*a* (e.g., whether there is frequency hopping or not). In the example of reference signal configuration 302, the one or more configured reference signals 310 may be added to subframe 315-*e*, as well as subframes 315 following each frequency hop, such as subframes 315-*g*, 315-*h*, and 315-*i*.

In a second example, every subframe 315 of a downlink transmission 305 may include the one or more configured reference signals 310. In a third example, the base station 105 may configure the UE 115 to receive the one or more configured reference signals 310 according to one or both of the first or the second example. In such cases, a reference signal configuration may be selected based on network conditions or based on one or more characteristics of the downlink transmission (e.g., frequency hopping, SNR, etc.). In a fourth example, the one or more configured reference signals 310 may be present every specific number of subframes 315 (e.g., every M subframes 315). In the example illustrated in reference signal configuration 301, the one or more configured reference signals may be present every six subframes 315 (e.g., may be present in subframes 315-*a*, 315-*c*, and 315-*d*). In the example illustrated in reference signal configuration 302, the one or more configured reference signals may be present every four subframes 315 (e.g., where the number of subframes 315 may be based on a number of subframes 315 between frequency hops).

As described with reference to FIG. 2, the base station 105 may transmit the one or more configured reference signals 310 to the UE 115 according to reference signal configuration 301 or 302, and the UE 115 may receive the one or more configured reference signals 310 and may use them to receive one or more transmissions from the base station 105 and/or perform channel estimation. In some cases, the UE 115 may transmit a channel report to the base station 105 based on the channel estimation. The configured reference signals 310 may increase an accuracy and a speed of the channel estimation at the UE 115 and thus decrease communication latency.

Figure 4A:
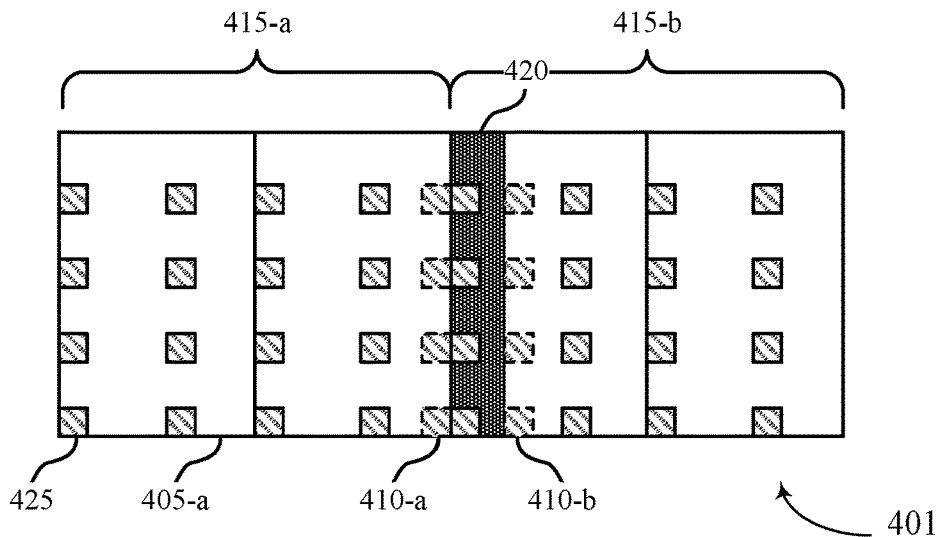
FIGS. 4A, 4B, and 4C illustrate examples of reference signal configurations that support reference signals for narrowband communications in accordance with aspects of the present disclosure.
Figure 4B:
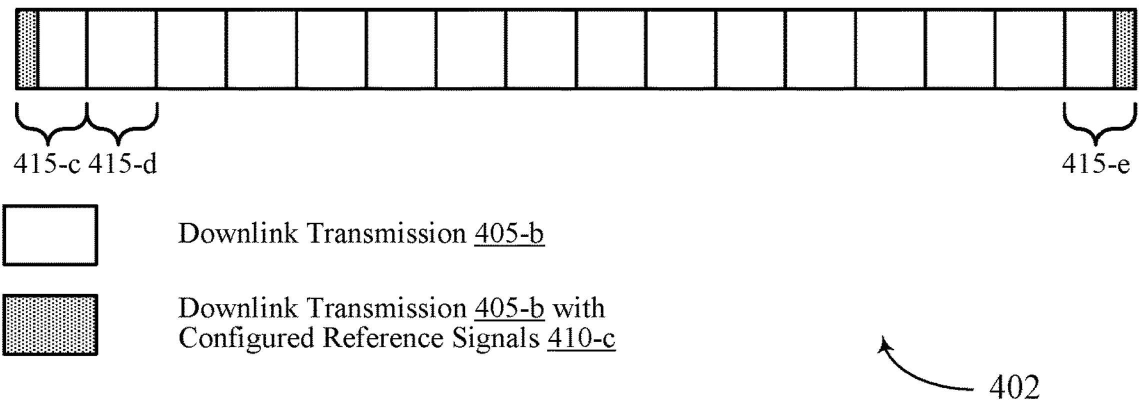
Figure 4C:
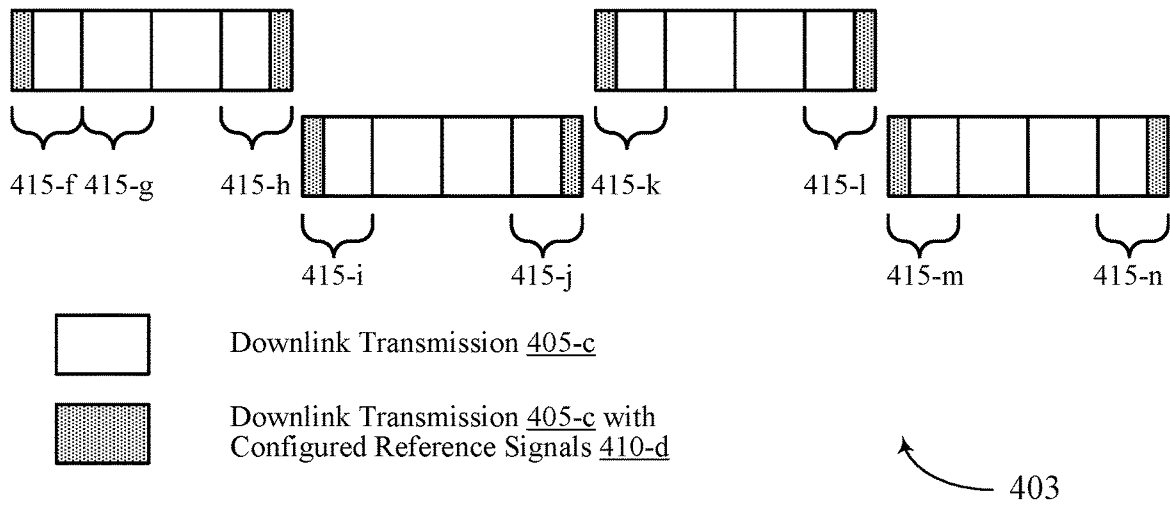

FIGS. 4A, 4B, and 4C illustrate examples of reference signal configurations 401, 402, and 403 that support reference signals for narrowband communications in accordance with aspects of the present disclosure. In some examples, reference signal configurations 401, 402, and 403 may implement aspects of wireless communications systems 100 or 200. For example, reference signal configurations 401, 402, and 403 may represent a configuration of additional reference signals (e.g., configured reference signals) transmitted from a base station 105 to a UE 115, which may be examples of a base station 105 and a UE 115 described with reference to FIGS. 1-3. Reference signal configuration 401 may illustrate an example of a symbol allocation associated with a downlink transmission 405-*a* including one or more configured reference signals 410. Reference signal configuration 402 may illustrate an example of a downlink transmission 405-*b* associated with one or more configured reference signals 410-*c*, where downlink transmission 405-*b* is transmitted without frequency hopping. Reference signal configuration 403 may illustrate an example of a downlink transmission 405-*c* associated with the one or more configured reference signals 410-*d*, where downlink transmission 405-*c* is transmitted with frequency hopping. As described with reference to FIG. 2, the base station 105 may configure the UE 115 with reference signal configuration 401, 402, or 403 such that the UE 115 may receive the one or more configured reference signals 410.

Reference signal configurations 401, 402, and 403 may be associated with high doppler regimes. In some cases, the base station 105 may identify that a high doppler regime exists for a downlink transmission 405 and may implement reference signal configuration 401, 402, or 403. Additionally or alternatively, the UE 115 may identify that a high doppler regime exists for a downlink transmission 405 and may transmit a request for reference signal configuration 401, 402, or 403 to the base station 105. The base station 105 may transmit the one or more configured reference signals 410 at a beginning and end of the downlink transmission 405 (e.g., or at a beginning and end of a portion of the downlink transmission 405), where the one more configured reference signals 410 may increase channel estimation accuracy and/or support interpolation.

As illustrated by reference signal configuration 401, one or more configured reference signals 410-*a* may be present in a last symbol before a frequency hop 420 and one or more configured reference signals 410-*b* may be present in a first symbol after the frequency hop 420. The location(s) of the one or more configured reference signals 410 may be based on a start symbol of a PDSCH (e.g., downlink transmission 405-*a* or a portion of downlink transmission 405-*a*), a number of symbols used by a UE to retune from a first narrowband to a second narrowband of the frequency hop 420 (e.g., which may be based on a capability of the UE 115), and a number of antenna ports used to transmit or receive the one or more configured reference signals 410. A symbol number indicating a location of the one or more configured reference signals 410-*a* or 410-*b* may be indicated by a table, such as Table 1 below. For example, the UE 115 may be scheduled for a frequency hop beginning at symbol 0 (e.g., a first symbol of a subframe 415-*b*) that lasts for 2 symbols (e.g., and therefore takes place in symbols 0 and 1 of subframe 415-*b*). The one or more configured reference signals 410 (e.g., and one or more baseline reference signals 425) may be transmitted or received over 4 ports. As such, the base station 105 may configure the UE 115 to receive the one or more configured reference signals 410-*a* over symbol 13 of subframe 415-*a* and to receive the one or more configured reference signals 410-*b* over symbol 2 (e.g., a third symbol) of subframe 415-*b*.

TABLE 1

Reference Signal Allocation Within Subframe(s) Associated with a Frequency Hop

| Start Symbol for PDSCH | Number of Symbols Used for Retuning (UE capability) | Symbols Used for Retuning | Reference Signal Symbol at End of Subframe 1 or 2 ports | Reference Signal Symbol at End of Subframe 4 ports | Reference Signal Symbol at Beginning of Subframe 1 or 2 ports | Reference Signal Symbol at Beginning of Subframe 4 ports |
|---|---|---|---|---|---|---|
| 0 | 0 | — | 13 | 13 | | |
| | 1 | 0 | 13 | 13 | 1 | |
| | 2 | 0, 1 | 13 | 13 | 2 | 2 |
| 1 | 0 | — | 13 | 13 | | |
| | 1 | 1 | | 13 | 2 | 2 |
| | 2 | 0, 1 | 13 | 13 | 2 | 2 |
| 2 | 0 | — | 13 | 13 | | |
| | 1 | 2 | | | 3 | 3 |
| | 2 | 1, 2 | | 13 | 3 | 3 |

As described above, the UE 115 may transmit a request to the base station 105 for the one or more configured reference signals 410. In a first example, the UE 115 may be configured with a table similar to Table 1 and may request the one or more configured reference signals 410 based on the table (e.g., requesting locations indicated by the table). In a second example, the UE 115 may request custom tones for the one or more configured reference signals 410 based on channel conditions at the UE 115 (e.g., to increase throughput). For example, the UE 115 may request one or more configured reference signals 410 on symbol 13 over one, two, or four antenna ports. Additionally or alternatively, the UE 115 may request one or more configured reference signals 410 on symbols 1, 2, or 3 over one, two, or four antenna ports.

The above-described configurations may support transmission of one or more configured reference signals 410-*c* from the base station 105 to the UE 115 at the beginning and end of a downlink transmission 405-*b*, as illustrated in reference signal configuration 402. For example, the one or more configured reference signals 410-*c* may be transmitted in subframes 415-*c* and 415-*e* of the downlink transmission 405-*b*. Additionally or alternatively, the above-described configurations may support transmission of one or more configured reference signals 410-*d* from the base station 105 to the UE 115 at the beginning and end of portions of a downlink transmission 405-*c* associated with one or more frequency hops, as illustrated in reference signal configuration 403. For example, the one or more configured reference signals 410-*d* may be transmitted in subframes 415-*f*, 415-*h*, 415-*i*, 415-*j*, 415-*k*, 415-*l*, 415-*m*, and 415-*n* of the downlink transmission 405-*c*.

The base station 105 may transmit the one or more configured reference signals 410 to the UE 115 according to reference signal configuration 401, 402, or 403, and the UE 115 may receive the one or more configured reference signals 410 and may use them to receive one or more transmissions from the base station 105 and/or perform channel estimation. In some cases, the UE 115 may transmit a channel report to the base station 105 based on the channel estimation. The configured reference signals 410 may increase an accuracy and a speed of the channel estimation at the UE 115 and thus decrease communication latency.

Figure 5A:
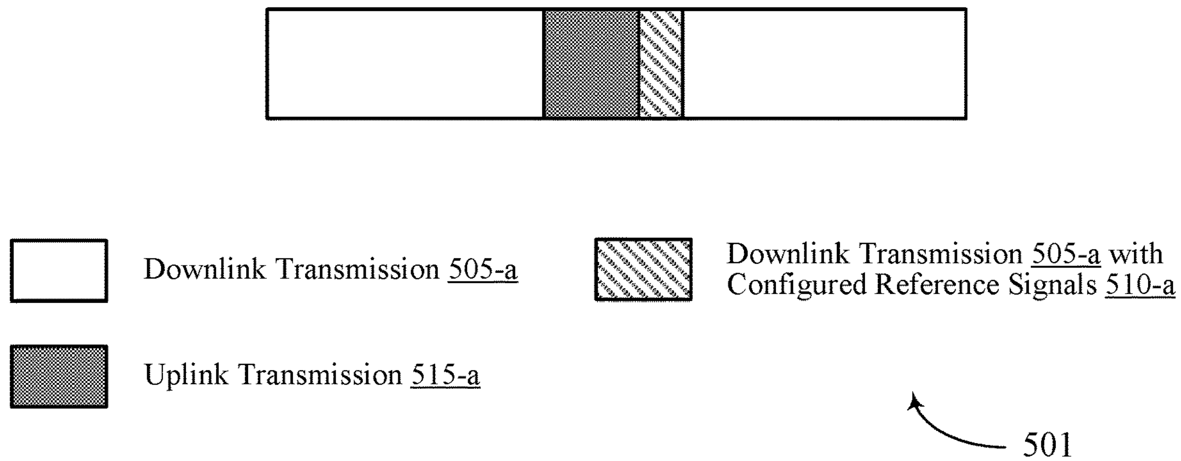
FIGS. 5A and 5B illustrate examples of reference signal configurations that support reference signals for narrowband communications in accordance with aspects of the present disclosure.
Figure 5B:
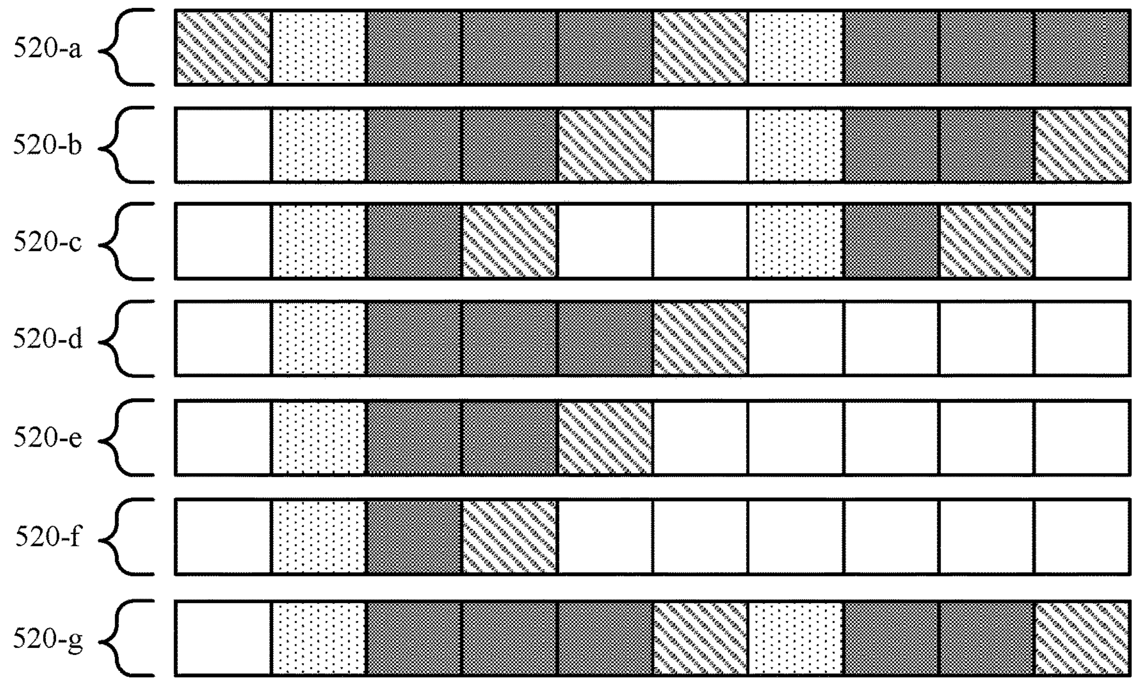

FIGS. 5A and 5B illustrate examples of reference signal configurations 501 and 502 that support reference signals for narrowband communications in accordance with aspects of the present disclosure. In some examples, reference signal configurations 501 and 502 may implement aspects of wireless communications systems 100 or 200. For example, reference signal configurations 501 and 502 may represent a configuration of additional reference signals (e.g., configured reference signals) transmitted from a base station 105 to a UE 115, which may be examples of a base station 105 and a UE 115 described with reference to FIGS. 1-4. Reference signal configuration 501 may illustrate an example of a downlink transmission 505-*a* associated with one or more configured reference signals 510-*a*, where the downlink transmission 505-*a* is associated with half-duplex transmissions. Reference signal configuration 502 may illustrate an example of one or more TDD transmission schedules 520, where the TDD transmission schedules 520 may be based on a TDD uplink-downlink configuration. As described with reference to FIG. 2, the base station 105 may configure the UE 115 with reference signal configuration 501 or 502 for receiving one or more configured reference signals 510.

Reference signal configuration 501 may illustrate a half-duplex uplink transmission 515-*a* from the UE 115 to the base station 105, within a longer downlink transmission 505-*a* from the base station 105 to the UE 115. For example, uplink transmission 515-*a* may represent a channel quality information (CQI) report that the base station 105 requests from the UE 115. In some cases, reference signal configuration 501 may be associated with a low SNR regime. According to reference signal configuration 501, the base station 105 may transmit one or more configured reference signals 410-*a* following the uplink transmission 515-*a* (e.g., in a first number of subframes following the uplink transmission 515-*a*) in order to warm up the downlink channel estimation (e.g., increase channel estimation speed).

Reference signal configuration 502 may illustrate TDD transmission schedules 520-*a* through 520-*g*. A TDD transmission schedule 520 may be associated with one or more configured reference signals 510 at a beginning of a transmission or a beginning of a portion of a transmission following a frequency hop, as described with reference to FIG. 3. Additionally, a TDD transmission schedule 520 may be associated with one or more configured reference signals 510-*b* in a first downlink subframe (e.g., a first number of downlink subframes) following a set of subframes scheduled for uplink transmissions 515. In some cases, the subframes scheduled for uplink transmissions 515 may include one or more uplink transmission 515, while in some cases the subframes scheduled for uplink transmissions 515 may be at least partially empty of transmissions. Reference signal configuration 502 may support retuning from uplink transmissions 515-*b* to downlink transmissions 505-*b* at the UE 115.

In some cases, a TDD transmission schedule 520 may include one or more special subframes 525 that support downlink transmissions (e.g., PDSCH transmissions). Such special subframes may support different locations than other downlink subframes for the one or more configured reference signals 510. The locations of the one or more configured reference signals 510 may also be different for different special subframe types or configurations. In some cases, different TDD transmission schedules 520 may be associated with different downlink-to-uplink switch-point periodicities, and locations for the one or more configured reference signals 510-*b* may be based on the switch-point periodicities. For example, TDD transmission schedules 520-*a*, 520-*b*, 520-*c*, and 520-*g* may be associated with a switch-point periodicity of 5 ms, while TDD transmission schedules 520-*d*, 520-*e*, and 520-*f* may be associated with a switch-point periodicity of 10 ms.

The base station 105 may transmit the one or more configured reference signals 510 to the UE 115 according to reference signal configuration 501 or 502, and the UE 115 may receive the one or more configured reference signals 510 and may use them to receive one or more transmissions from the base station 105 and/or perform channel estimation. In some cases, the UE 115 may transmit a channel report to the base station 105 based on the channel estimation. The configured reference signals 510 may increase an accuracy and a speed of the channel estimation at the UE 115 and thus decrease communication latency.

Figure 6:
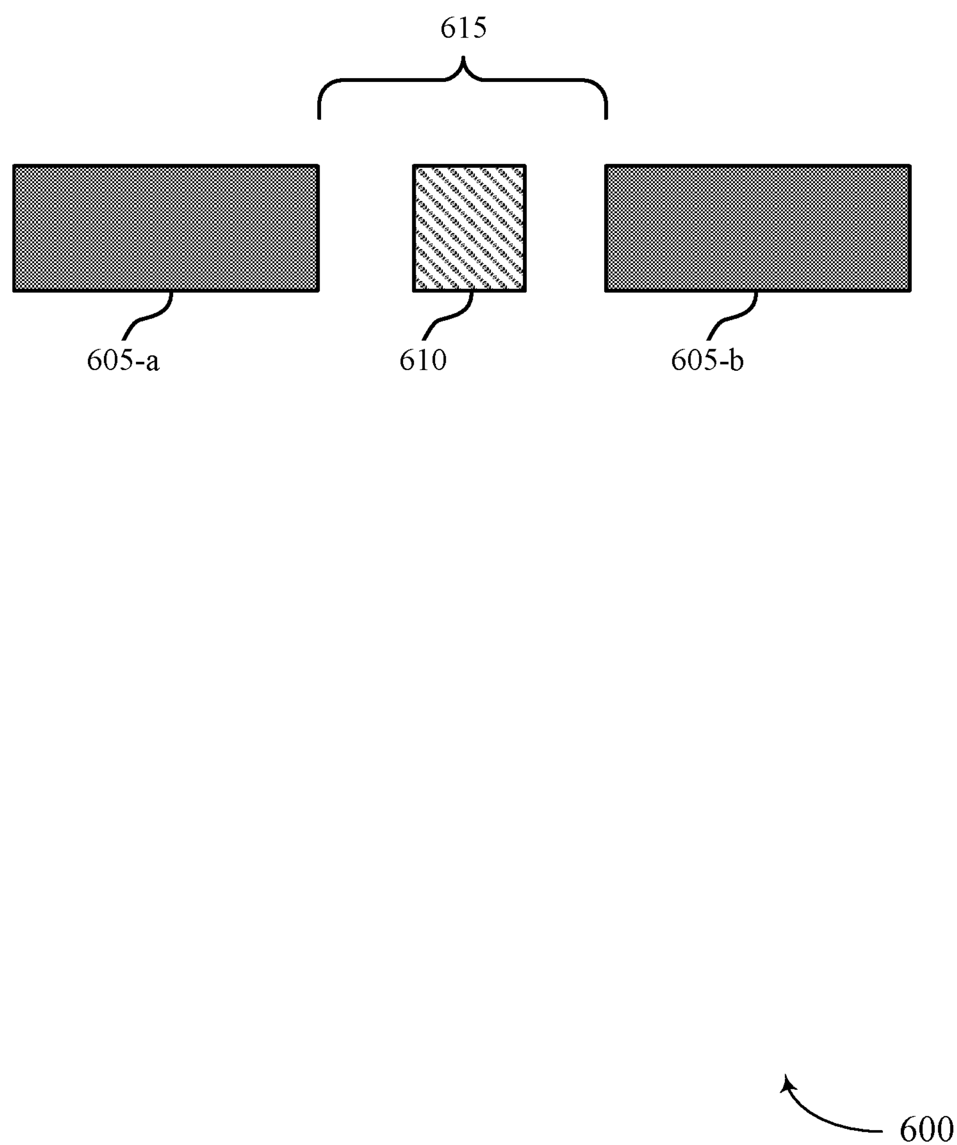
FIG. 6 illustrates an example of a reference signal configuration that supports reference signals for narrowband communications in accordance with aspects of the present disclosure.

FIG. 6 illustrates an example of a reference signal configuration 600 that supports reference signals for narrowband communications in accordance with aspects of the present disclosure. In some examples, reference signal configuration 600 may implement aspects of wireless communications systems 100 or 200. For example, reference signal configuration 600 may represent a configuration of additional reference signals (e.g., configured reference signals) transmitted from a base station 105 to a UE 115, which may be examples of a base station 105 and a UE 115 described with reference to FIGS. 1-5. As described with reference to FIG. 2, the base station 105 may configure the UE 115 with reference signal configuration 600 for receiving one or more configured reference signals 610.

In some cases, the UE 115 and the base station 105 may communicate using half-duplex or other transmissions that employ an uplink compensation gap 615. An uplink compensation gap 615 may represent a gap in uplink transmissions 605 from the UE 115 to the base station 105, where the uplink compensation gap 615 may be scheduled for the UE 115 to regain synchronization. For example, a local oscillator of the UE 115 may drift during uplink transmissions 605-*a* because of heating and temperature differences, and the uplink compensation gap 615 may allow the UE to monitor downlink reference signals to regain synchronization and/or for the local oscillator to cool down. According to reference signal configuration 600, the base station may transmit one or more configured reference signals 610 to the UE 115 in the uplink compensation gap 615. The one or more configured reference signals 610 may decrease a synchronization time for the UE 115 when returning to downlink communications (e.g., after uplink transmission 605-*b*). The base station 105 may configure the UE 115 to assume the one or more configured references signals 610 are to occur in the uplink compensation gap 615 or in each uplink compensation gap 615 corresponding to uplink transmissions 605.

The base station 105 may transmit the one or more configured reference signals 610 to the UE 115 according to reference signal configuration 600, and the UE 115 may receive the one or more configured reference signals 610 and may use them to perform channel estimation. In some cases, the UE 115 may transmit a channel report to the base station 105 based on the channel estimation. The configured reference signals 610 may increase an accuracy and a speed of the channel estimation at the UE 115 and thus decrease communication latency.

Figures 7A, 7B, 7C:
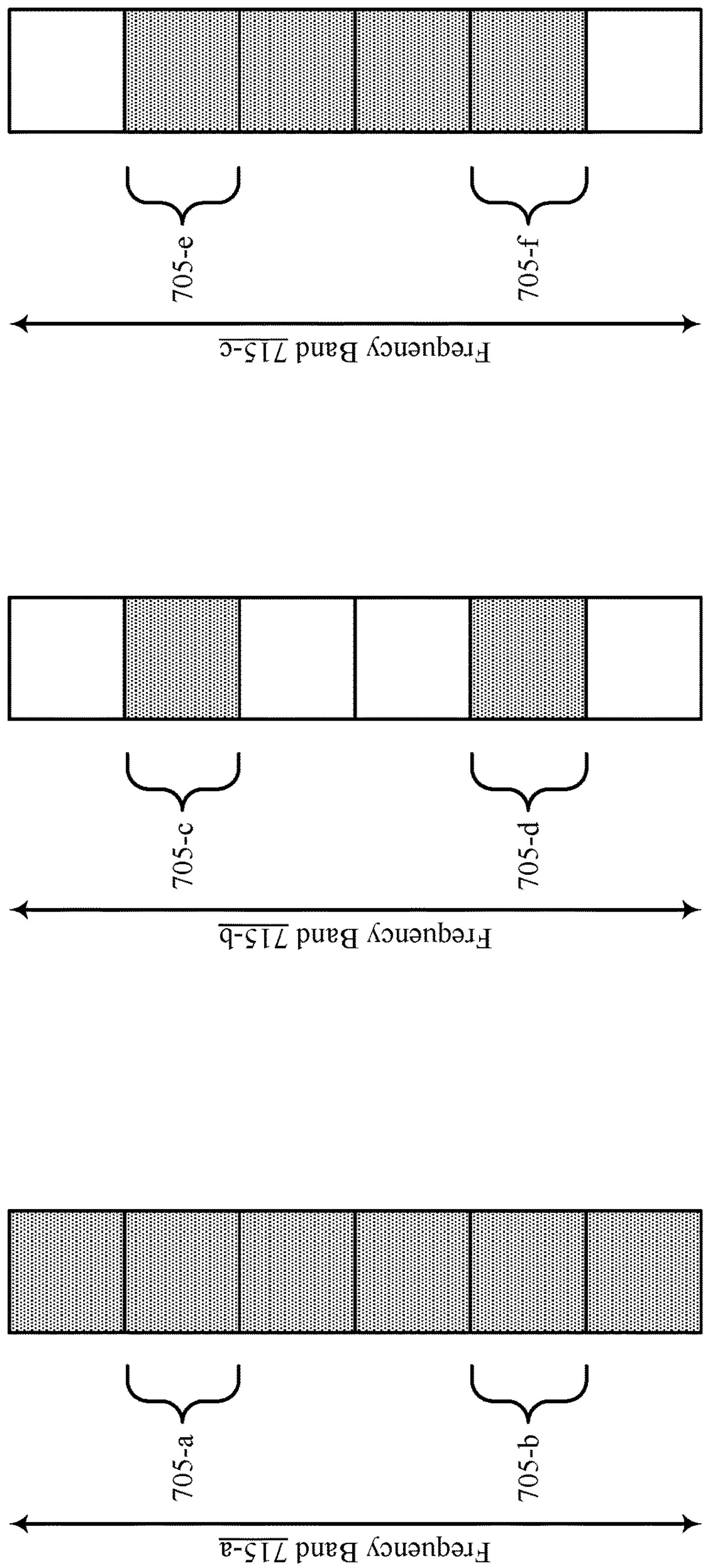
FIGS. 7A, 7B, and 7C illustrate examples of reference signal configurations that support reference signals for narrowband communications in accordance with aspects of the present disclosure.

FIGS. 7A, 7B, and 7C illustrate examples of reference signal configurations 701, 702, and 703 that support reference signals for narrowband communications in accordance with aspects of the present disclosure. In some examples, reference signal configurations 701, 702, and 703 may implement aspects of wireless communications systems 100 or 200. For example, reference signal configurations 701, 702, and 703 may represent a configuration of additional reference signals (e.g., configured reference signals) transmitted from a base station 105 to a UE 115, which may be examples of a base station 105 and a UE 115 described with reference to FIGS. 1-6. As described with reference to FIG. 2, the base station 105 may configure the UE 115 with reference signal configuration 701, 702, or 703 for receiving one or more configured reference signals 710.

In some examples, reference signal configurations 701, 702, and 703 may implement aspects of reference signal configurations 301, 302, 401, 402, 403, 501, 502, or 600. For example, the base station 105 may transmit the one or more configured reference signals 710 to the UE 115 in a frequency domain according to one or more of reference signal configurations 701, 702, or 703, and in a time domain according to one or more of reference signal configurations 301, 302, 401, 402, 403, 501, 502, or 600. Reference signal configurations 701, 702, or 703 may represent one subframe of a frequency band 715 (e.g., an allocated frequency band 715) that includes a downlink transmission from the base station 105 to the UE 115.

In some cases, the frequency band 715 may be a narrowband used by the base station 105 and the UE 115 for downlink communications. For example, the base station 105 may schedule a downlink transmission over two RBs 705 (e.g., allocated RBs 705) of the frequency band 715. The allocated RBs 705 may include RBs 705-*a* and 705-*b*, RBs 705-*c* and 705-*d*, or RBs 705-*e* and 705-*f* for reference signal configurations 701, 702, and 703, respectively. The base station 105 may determine which RBs 705 (e.g., physical RBs (PRBs)) of the frequency band 715 are to include one or more configured reference signals 710 for the UE 115. In a first example, as illustrated in reference signal configuration 701, one or more configured reference signals 710-*a* may be present in all of the RBs 705 within a frequency band 715-*a* associated with the downlink transmission. In a second example, as illustrated in reference signal configuration 702, one or more configured reference signals 710-*b* may be present in the RBs 705 allocated to the downlink transmission (e.g., RBs 705-*c* and 705-*d*). In a third example, as illustrated in reference signal configuration 703, the one or more configured reference signals 710-*c* may be present in the RBs 705 allocated to the downlink transmission and in any intervening RBs 705 (e.g., RBs 705-*e* through 705-*f*).

The frequency location (e.g., occupied RBs 705) of the one or more configured reference signals 710 may be configured semi-statically (e.g., via RRC signaling) or dynamically (e.g., via DCI signaling). In some cases, the base station 105 may determine which RBs 705 are to include the one or more configured reference signals 710 based on a processing time for the one or more configured reference signals 710. For example, in some cases, the base station 105 may process the one or more configured reference signals 710 using an inverse fast Fourier transform (IFFT), which may reduce processing time in comparison to using a minimum mean square error (MMSE) process. An IFFT may be performable on groups of one or more contiguous RBs 705. As such, the base station 105 may determine to use a reference signal configuration (e.g., reference signal configuration 701 or 703) in which the one or more configured reference signals 710 are grouped in one or more contiguous RBs 705 (e.g., in order to perform an IFFT and reduce processing time).

The base station 105 may transmit the one or more configured reference signals 710 to the UE 115 according to reference signal configuration 701, 702, or 703, and the UE 115 may receive the one or more configured reference signals 710 and may use them to receive one or more transmissions from the base station 105 and/or perform channel estimation. In some cases, the UE 115 may transmit a channel report to the base station 105 based on the channel estimation. The configured reference signals 710 may increase an accuracy and a speed of the channel estimation at the UE 115 and thus decrease communication latency.

Figure 8:
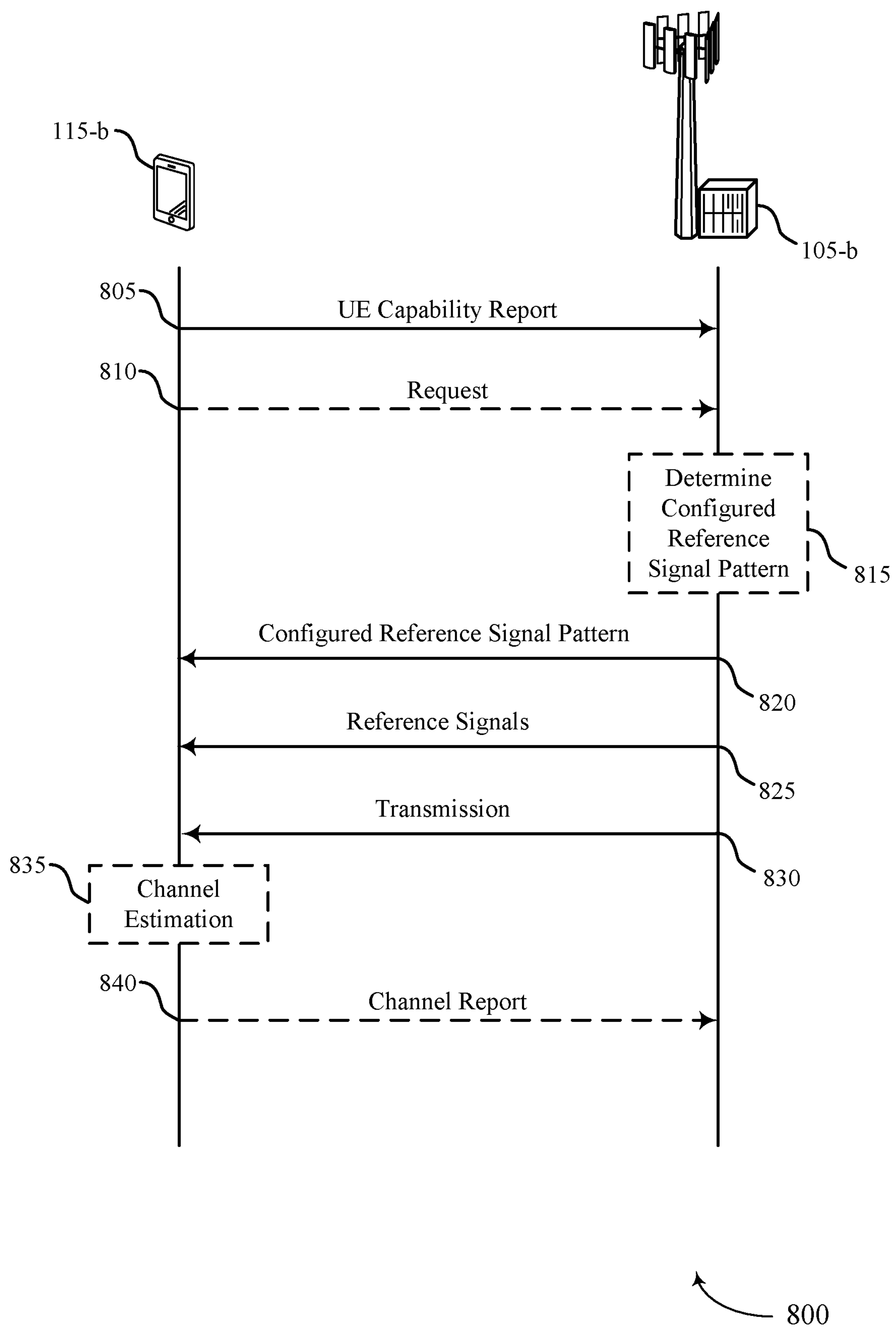
FIG. 8 illustrates an example of a process flow that supports reference signals for narrowband communications in accordance with aspects of the present disclosure.

FIG. 8 illustrates an example of a process flow 800 that supports reference signals for narrowband communications in accordance with aspects of the present disclosure. In some examples, process flow 800 may be implemented by, or relate to, aspects of wireless communications systems 100 or 200. In some examples, process flow 800 may implement aspects of reference signal configurations 301, 302, 401, 402, 403, 501, 502, 600, 701, 702, or 703. Process flow 800 may be implemented by a base station 105-*b* or a UE 11-*b*, which may be examples of a base station 105 and a UE 115 described with reference to FIGS. 1-7. In some cases, base station 105-*b* may configure UE 115-*b* with one or more configured reference signals and may transmit the one or more configured reference signals to UE 115-*b* in order to improve a channel estimation at UE 115-*b*.

In the following description of the process flow 800, the operations between the UE 115-*b* and the base station 105-*b* may be transmitted in a different order than the order shown, or the operations performed by the base station 105-*b* or the UE 115-*b* may be performed in different orders or at different times. Specific operations may also be left out of the process flow 800, or other operations may be added to the process flow 800. Although the base station 105-*b* and the UE 115-*b* are shown performing the operations of process flow 800, some aspects of some operations may also be performed by another wireless device.

At 805, UE 115-*b* may transmit, to base station 105-*b*, a capability report indicating a UE capability associated with a configurable reference signal pattern. In some cases, UE 115-*b* may transmit the capability report in response to a request from base station 105-*b* (e.g., based on one or more channel conditions or transmission characteristics). In some cases, UE 115-*b* may determine to transmit the capability report to base station 105-*b* based on one or more channel conditions or transmission characteristics of a scheduled transmission. Channel conditions may include a measured or reported noise level (e.g., SNR), an identified high-doppler regime, a frequency hop associated with a transmission on the channel, or the like.

At 810, in some cases, UE 115-*b* may transmit, to base station 105-*b*, a request for a configurable reference signal pattern. In some cases, UE 115-*b* may determine that a downlink transmission associated with the first set of reference signals is associated with one or more of a low SNR regime, a high doppler regime, or a frequency hop, and may transmit the request to base station 105-*b* based on the determining. For example, UE 115-*b* may determine that a regime characteristic (e.g., high doppler or low SNR) or a frequency affects a channel estimation speed or a channel estimation accuracy and may transmit the request based on the determination.

At 815, in some cases, base station 105-*b* may identify one or more network conditions including a low SNR regime, a high doppler regime, or a frequency hop associated with a downlink transmission to UE 115-*b* and may determine a configured reference signal pattern based on the one or more network conditions. In some cases, base station 105-*b* may determine a configured reference signal pattern based on the request from UE 115-*b*. Determining the configured reference signal pattern may include determining time and/or frequency resources for a set of configured reference signals. Additionally, base station 105-*b* may determine one or more characteristics associated with the configured reference signal pattern, such as one or more of an on-off duration, a power boosting value, a scrambling sequence, a rate matching or puncturing scheme, a channel estimation association, or the like.

The configured reference signals may be configured to be transmitted over a first number of subframes at a beginning of a transmission with a low SNR in order increase channel estimation speed or warm up channel estimation. In some cases, the configured reference signals may follow an uplink transmission or an uplink transmission opportunity. Additionally or alternatively, the configured reference signals may be configured to be transmitted over a number of subframes at a beginning and end of a transmission to support interpolation for high-doppler transmissions. In some examples, the configured reference signals may be configured to be transmitted in a gap between uplink transmissions. The base station may configure the configured reference signals to be transmitted using all or portions of a frequency band (e.g., a narrowband) associated with a transmission.

At 820, base station 105-*b* may transmit, to UE 115-*b*, an indication of a configured reference signal pattern based on receiving the capability report. In some cases, transmitting an indication of the configured reference signal pattern may be based on the request from UE 115-*b*. In some cases, transmitting an indication of the configured reference signal pattern may be based on identifying the one or more network conditions. The indication may include an indication of time and frequency resources associated with the configured reference signals. The indication may additionally include one or more characteristics associated with the configured reference signal pattern, such as one or more of an on-off duration, a power boosting value, a scrambling sequence, a rate matching or puncturing scheme, a channel estimation association, or the like.

At 825, base station 105-*b* may transmit, to UE 115-*b*, a first set of reference signals associated with a baseline reference signal pattern and a second set of reference signals associated with the configured reference signal pattern (e.g., the set of configured reference signals). UE 115-*b* may monitor for and receive the first and second sets of reference signals according to the indication of the configured reference signal pattern.

At 830, UE 115-*b* may receive a transmission from base station 105-*b* based on the first set of reference signals and the second set of reference signals. At 835, UE 115-*b* may perform a channel estimation based on the first set of reference signals and the second set of reference signals. In some cases, UE 115-*b* may decode a transmission (e.g., subsequent transmission) from base station 105-*b* based on the channel estimation. In some cases, at 840, UE 115-*b* may transmit, to base station 105-*b*, a channel report based on the channel estimation.

Figure 9:
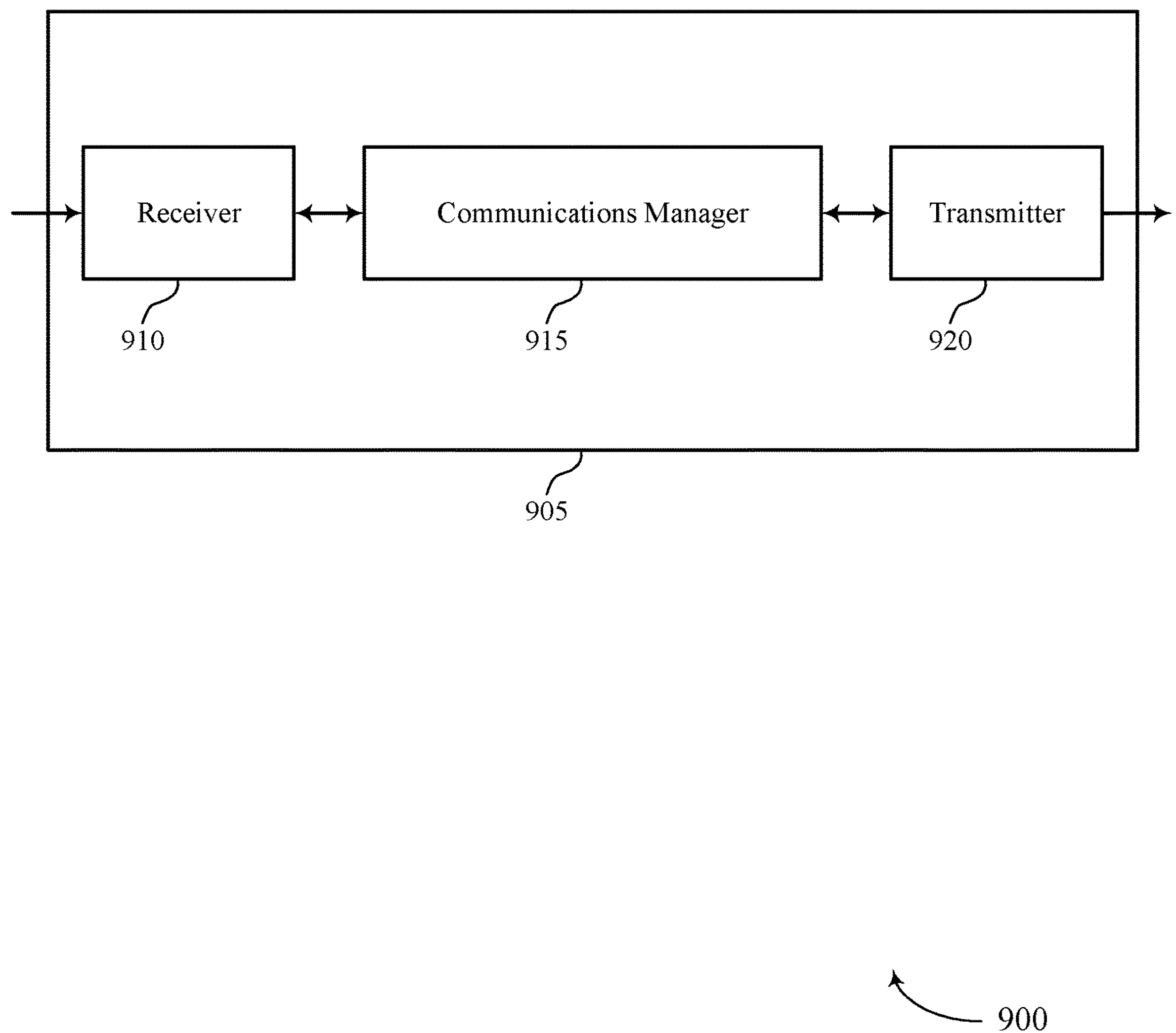
FIGS. 9 and 10 show block diagrams of devices that support reference signals for narrowband communications in accordance with aspects of the present disclosure.

FIG. 9 shows a block diagram 900 of a device 905 that supports reference signals for narrowband communications in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reference signals for narrowband communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a base station, a capability report indicating a UE capability associated with a configurable reference signal pattern, receive, from the base station, an indication of a configured reference signal pattern based on transmitting the capability report, receive, from the base station, a first set of reference signals associated with a baseline reference signal pattern and a second set of reference signals associated with the configured reference signal pattern, and receive, from the base station, a transmission based on the first set of reference signals and the second set of reference signals. The communications manager 915 may be an example of aspects of the communications manager 1210 described herein.

The communications manager 915, or its sub-components, may be implemented in hardware, software (e.g., executed by a processor), or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

The actions performed by the communications manager 915 as described herein may be implemented to realize one or more potential advantages. For example, communications manager 915 may increase communication reliability and decrease communication latency at a UE 115 by supporting reception of additional configured reference signals, which may reduce channel estimation time and improve channel estimation accuracy. These changes to channel estimation may reduce transmission delays, improve transmission accuracy, and reduce retransmissions. As such, communications manager 915 may save power and increase battery life at a UE 115 by supporting reception of additional configured reference signals and increasing channel estimation accuracy.

Figure 10:
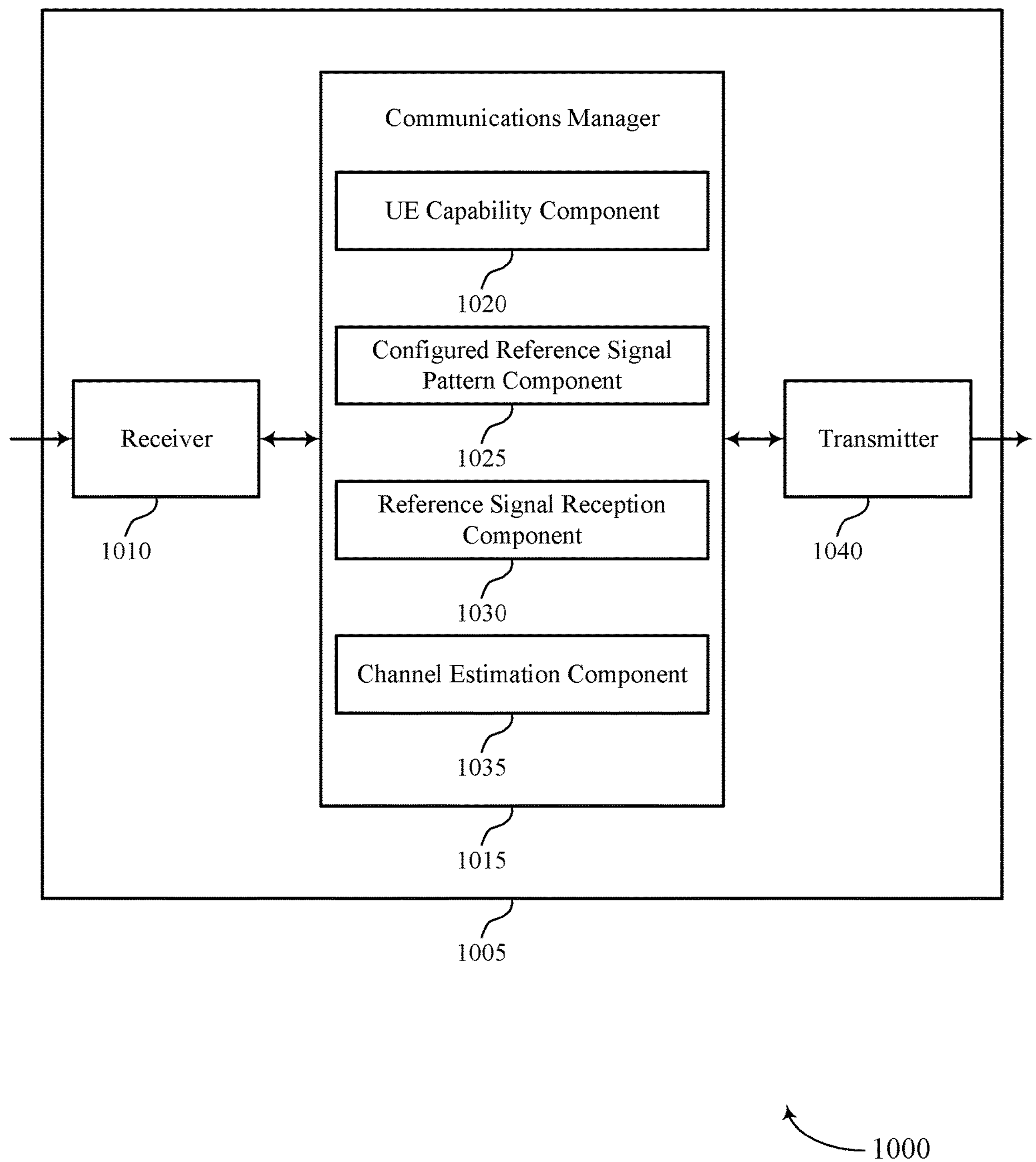

FIG. 10 shows a block diagram 1000 of a device 1005 that supports reference signals for narrowband communications in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to reference signals for narrowband communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an UE capability component 1020, a configured reference signal pattern component 1025, a reference signal reception component 1030, and a channel estimation component 1035. The communications manager 1015 may be an example of aspects of the communications manager 1210 described herein.

The UE capability component 1020 may transmit, to a base station, a capability report indicating a UE capability associated with a configurable reference signal pattern. The configured reference signal pattern component 1025 may receive, from the base station, an indication of a configured reference signal pattern based on transmitting the capability report. The reference signal reception component 1030 may receive, from the base station, a first set of reference signals associated with a baseline reference signal pattern and a second set of reference signals associated with the configured reference signal pattern. The channel estimation component 1035 may receive, from the base station, a transmission based on the first set of reference signals and the second set of reference signals. The channel estimation component 1035 may perform a channel estimation based on the first set of reference signals and the second set of reference signals.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

A processor of a UE 115 (for example, controlling the receiver 1010, the transmitter 1040, or the transceiver 1220 as described with reference to FIG. 12) may increase communication reliability and accuracy by enabling the UE 115 to receive additional configured reference signals, which may increase reliability, and reduce latency (e.g., via implementation of system components described with reference to FIG. 11). Further, the processor of the UE 115 may identify one or more aspects of a configured reference signal configuration or pattern to perform the processes described herein. The processor of the UE 115 may use the configured reference signal configuration to receive the additional configured reference signals and perform channel estimation using at least the additional configured reference signals. The channel estimation based on the additional configured reference signals may increase communication accuracy and reliability. The processor of the UE 115 may further use the configured reference signal configuration to save power and increase battery life at the UE 115 (e.g., by strategically reducing retransmissions and decreasing latency due to channel estimation accuracy).

Figure 11:
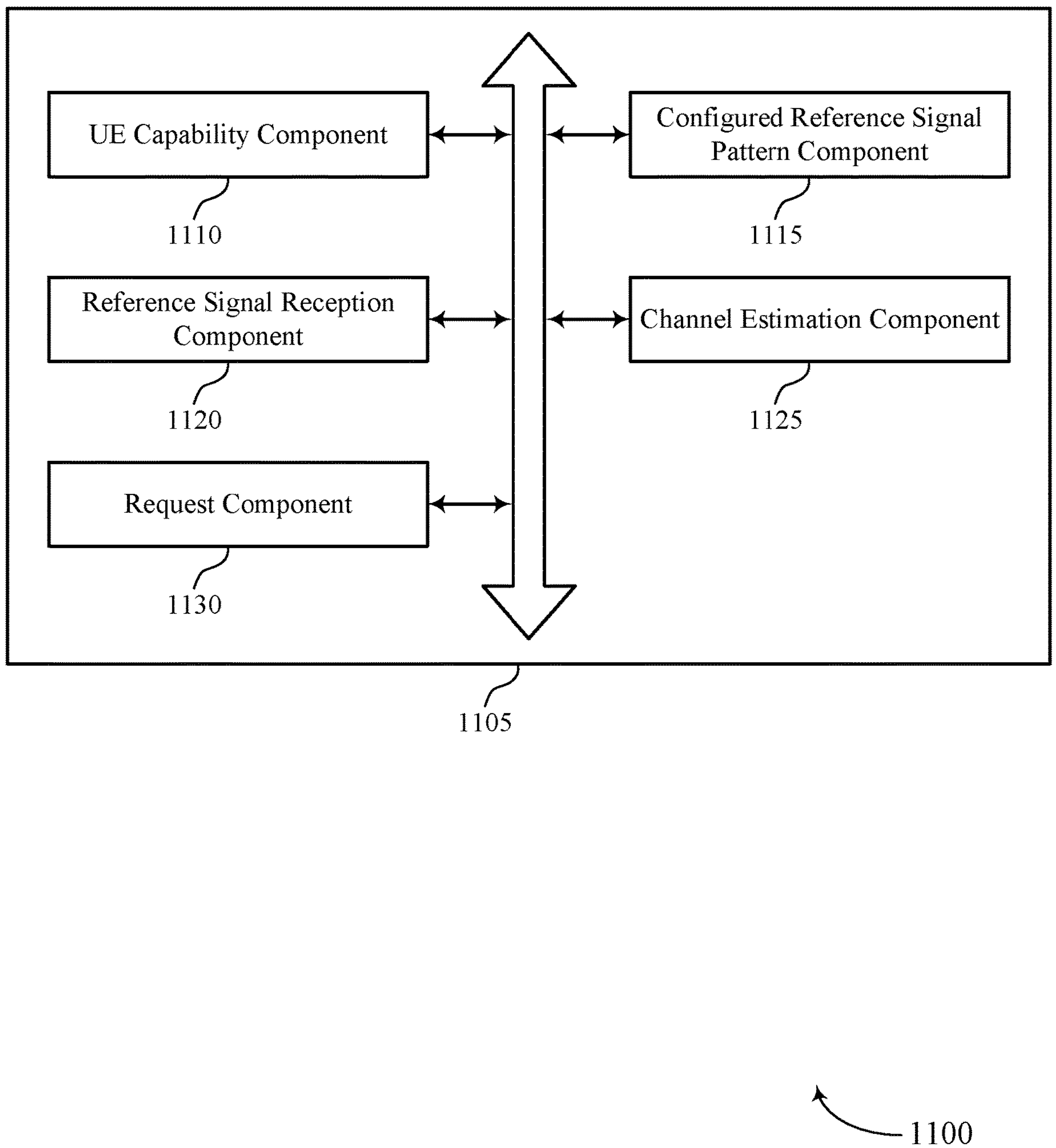
FIG. 11 shows a block diagram of a communications manager that supports reference signals for narrowband communications in accordance with aspects of the present disclosure.

FIG. 11 shows a block diagram 1100 of a communications manager 1105 that supports reference signals for narrowband communications in accordance with aspects of the present disclosure. The communications manager 1105 may be an example of aspects of a communications manager 915, a communications manager 1015, or a communications manager 1210 described herein. The communications manager 1105 may include an UE capability component 1110, a configured reference signal pattern component 1115, a reference signal reception component 1120, a channel estimation component 1125, and a request component 1130. Each of these modules may communicate, directly or indirectly, with one another (e.g., via one or more buses).

The UE capability component 1110 may transmit, to a base station, a capability report indicating a UE capability associated with a configurable reference signal pattern.

The configured reference signal pattern component 1115 may receive, from the base station, an indication of a configured reference signal pattern based on transmitting the capability report. In some examples, the configured reference signal pattern component 1115 may receive, from the base station, DCI indicating a pattern of the second set of reference signals, where the second set of reference signals is configured to be received based on the pattern. In some examples, the configured reference signal pattern component 1115 may receive, from the base station, DCI including an indication that the second set of reference signals is present.

In some examples, the configured reference signal pattern component 1115 may receive, from the base station, an indication that the second set of reference signals is disassociated with determining a RSRP or a RSRQ. In some examples, the configured reference signal pattern component 1115 may receive, from the base station, the indication of the configured reference signal pattern via one or more of RRC signaling, a MAC CE, or DCI.

In some cases, the configured reference signal pattern is based on a downlink transmission from the base station to the UE spanning one or more slots. In some cases, the downlink transmission is associated with a first frequency band different from a second frequency band associated with one or more previous downlink transmissions. In some cases, the second set of reference signals is configured to be received over a first number of slots at a beginning of the downlink transmission. In some cases, the first number of slots follow an uplink transmission including an uplink report or a time-division duplexed transmission. In some cases, the first number of slots follow a subframe reserved for uplink transmissions in a time-division duplexed frame structure. In some cases, the second set of reference signals is configured to be received over a first number of slots at a beginning of the downlink transmission and over a second number of slots at an end of the downlink transmission.

In some cases, a channel of the downlink transmission is rate matched around the second set of reference signals. In some cases, a channel of the downlink transmission is punctured by the second set of reference signals. In some cases, a channel of the downlink transmission is rate matched by the first set of reference signals. In some cases, the configured reference signal pattern is based on a channel type associated with the downlink transmission. In some cases, the configured reference signal pattern is based on a transmission configuration of an uplink transmission spanning one or more slots, the second set of reference signals configured to be received during a gap in the uplink transmission.

In some cases, the second set of reference signals is configured to be received over each resource block of a frequency band associated with a transmission assigned to the UE. In some cases, the second set of reference signals is configured to be received over resource blocks assigned to the UE. In some cases, the second set of reference signals is configured to be received over resource blocks between any two assigned resource blocks. In some cases, the second set of reference signals is configured to be received for every transmission of a channel assigned to the UE. In some cases, the second set of reference signals is configured to be received for every transmission of a channel scheduled from a USS. In some cases, the second set of reference signals is configured to be received over a time period based on one or more of a modulation coding scheme, a number of repetitions of a channel, or a frequency hopping pattern.

In some cases, the second set of reference signals is configured to have an EPRE based on the configured reference signal pattern, is dynamically configured to have an EPRE based on signaling from the base station, or is configured to have a same EPRE as the first set of reference signals. In some cases, the second set of reference signals is configured to have a same sequence as the first set of reference signals or a different sequence from the first set of reference signals. In some cases, the second set of reference signals is configured to be received over all antenna ports associated with the first set of reference signals or a subset of the antenna ports associated with the first set of reference signals.

In some cases, the second set of reference signals includes one or more of CRSs, DMRSs, or reference signals transmitted over ports associated with CRSs. In some cases, the configured reference signal pattern is based on one or more reference signals associated with a system information block in a same frequency band as the second set of reference signals. In some cases, the second set of reference signals is configured to puncture a downlink channel or be dropped by the UE if the second set of reference signals collide with one or more transmissions of the downlink channel. In some cases, a downlink channel is configured to puncture the second set of reference signals or be dropped by the UE if the second set of reference signals collide with one or more transmissions of the downlink channel.

The reference signal reception component 1120 may receive, from the base station, a first set of reference signals associated with a baseline reference signal pattern and a second set of reference signals associated with the configured reference signal pattern.

The channel estimation component 1125 may receive, from the base station, a transmission based on the first set of reference signals and the second set of reference signals. The channel estimation component 1125 may perform a channel estimation based on the first set of reference signals and the second set of reference signals. In some examples, the channel estimation component 1125 may transmit, to the base station, a channel report based on the channel estimation. In some examples, the channel estimation component 1125 may decode a transmission from the base station based on the channel estimation. In some examples, the channel estimation component 1125 may use the second set of reference signals to determine a RSRP or a RSRQ.

The request component 1130 may transmit, to the base station, a request for a configurable reference signal pattern, where receiving the indication of the configured reference signal pattern is based on the request. In some examples, the request component 1130 may determine that a downlink transmission associated with the first set of reference signals is associated with one or more of a low SNR regime, a high doppler regime, or a frequency hop, where transmitting the request to the base station is based on the determining.

Figure 12:
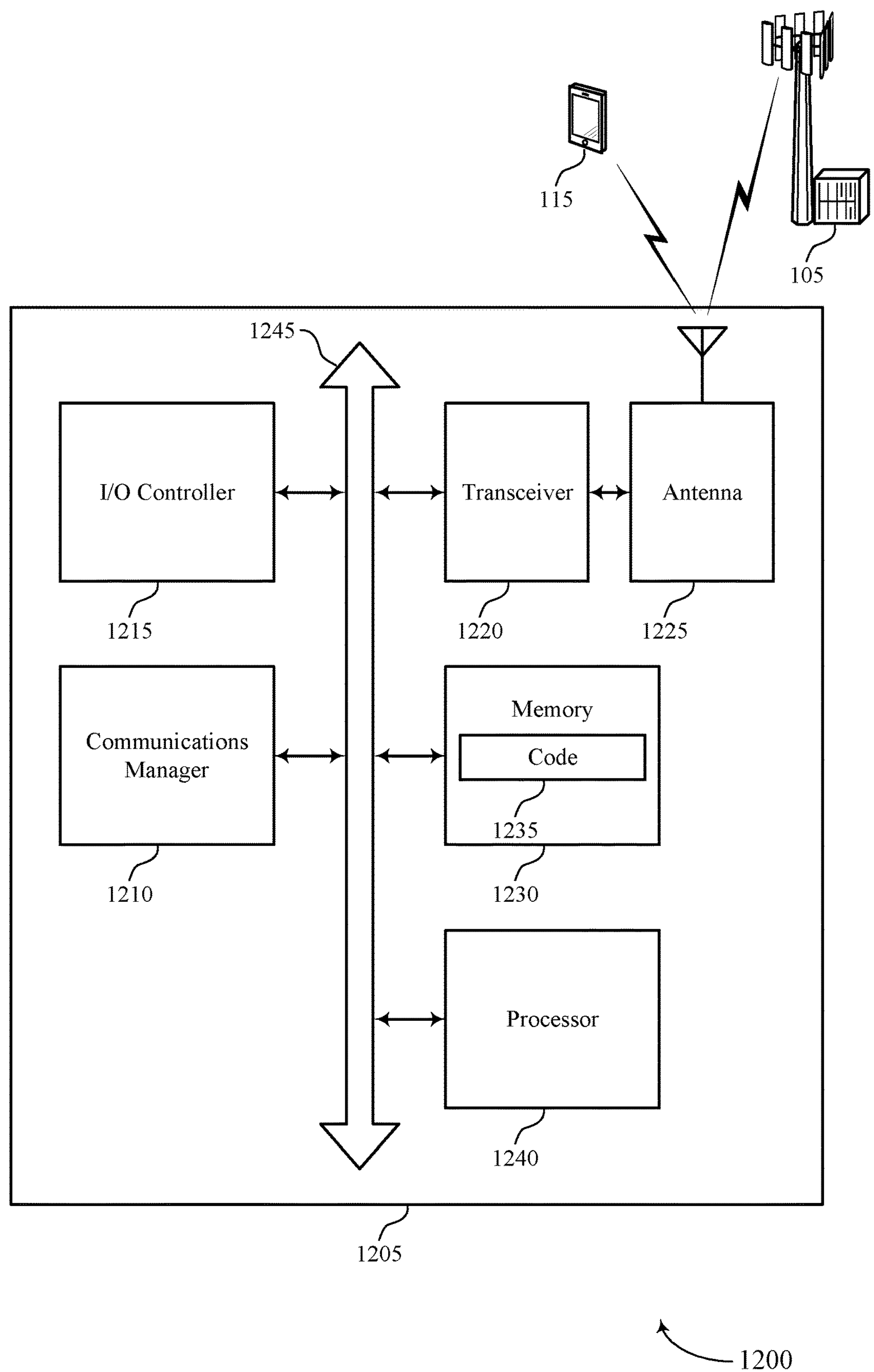
FIG. 12 shows a diagram of a system including a device that supports reference signals for narrowband communications in accordance with aspects of the present disclosure.

FIG. 12 shows a diagram of a system 1200 including a device 1205 that supports reference signals for narrowband communications in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may transmit, to a base station, a capability report indicating a UE capability associated with a configurable reference signal pattern, receive, from the base station, an indication of a configured reference signal pattern based on transmitting the capability report, receive, from the base station, a first set of reference signals associated with a baseline reference signal pattern and a second set of reference signals associated with the configured reference signal pattern, and receive, from the base station, a transmission based on the first set of reference signals and the second set of reference signals.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random access memory (RAM) and read only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting reference signals for narrowband communications).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
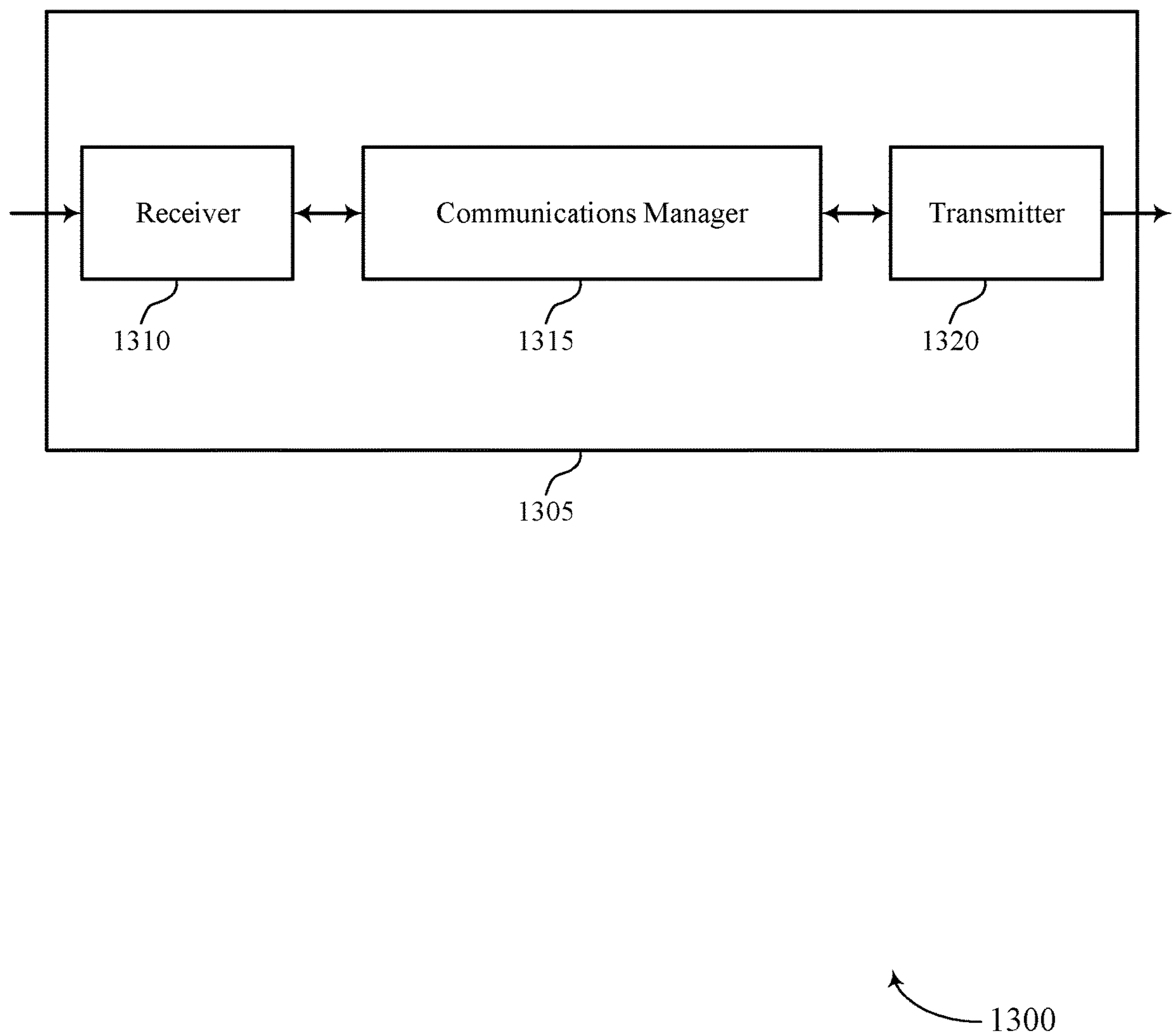
FIGS. 13 and 14 show block diagrams of devices that support reference signals for narrowband communications in accordance with aspects of the present disclosure.

FIG. 13 shows a block diagram 1300 of a device 1305 that supports reference signals for narrowband communications in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to reference signals for narrowband communications, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive, from a UE, a capability report indicating a UE capability associated with a configurable reference signal pattern, transmit, to the UE, an indication of a configured reference signal pattern based on receiving the capability report, and transmit, to the UE, a first set of reference signals associated with a baseline reference signal pattern and a second set of reference signals associated with the configured reference signal pattern. The communications manager 1315 may be an example of aspects of the communications manager 1610 described herein.

The communications manager 1315, or its sub-components, may be implemented in hardware, software (e.g., executed by a processor), or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
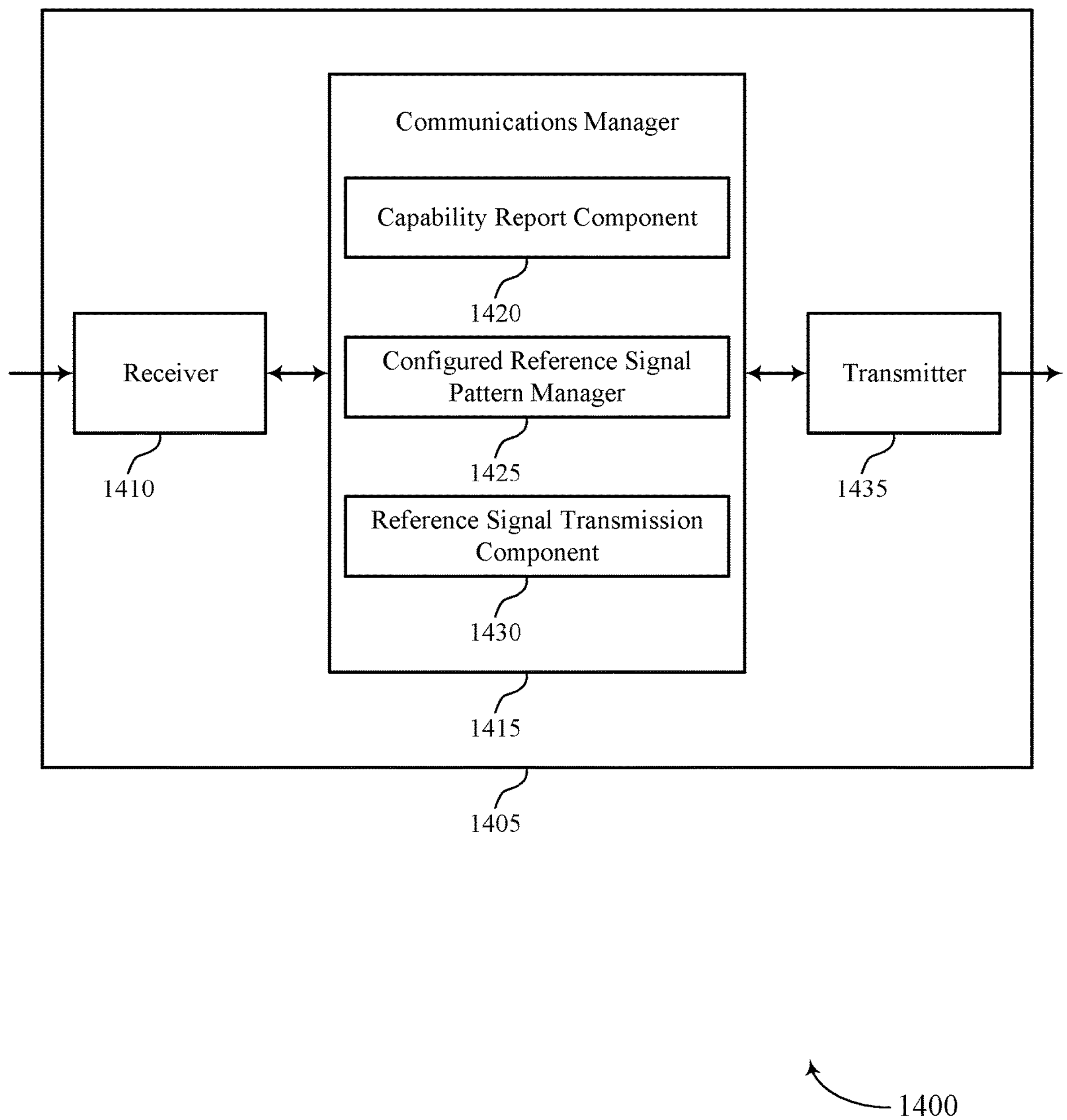

FIG. 14 shows a block diagram 1400 of a device 1405 that supports reference signals for narrowband communications in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to reference signals for narrowband communications, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a capability report component 1420, a configured reference signal pattern manager 1425, and a reference signal transmission component 1430. The communications manager 1415 may be an example of aspects of the communications manager 1610 described herein.

The capability report component 1420 may receive, from a UE, a capability report indicating a UE capability associated with a configurable reference signal pattern.

The configured reference signal pattern manager 1425 may transmit, to the UE, an indication of a configured reference signal pattern based on receiving the capability report.

The reference signal transmission component 1430 may transmit, to the UE, a first set of reference signals associated with a baseline reference signal pattern and a second set of reference signals associated with the configured reference signal pattern.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
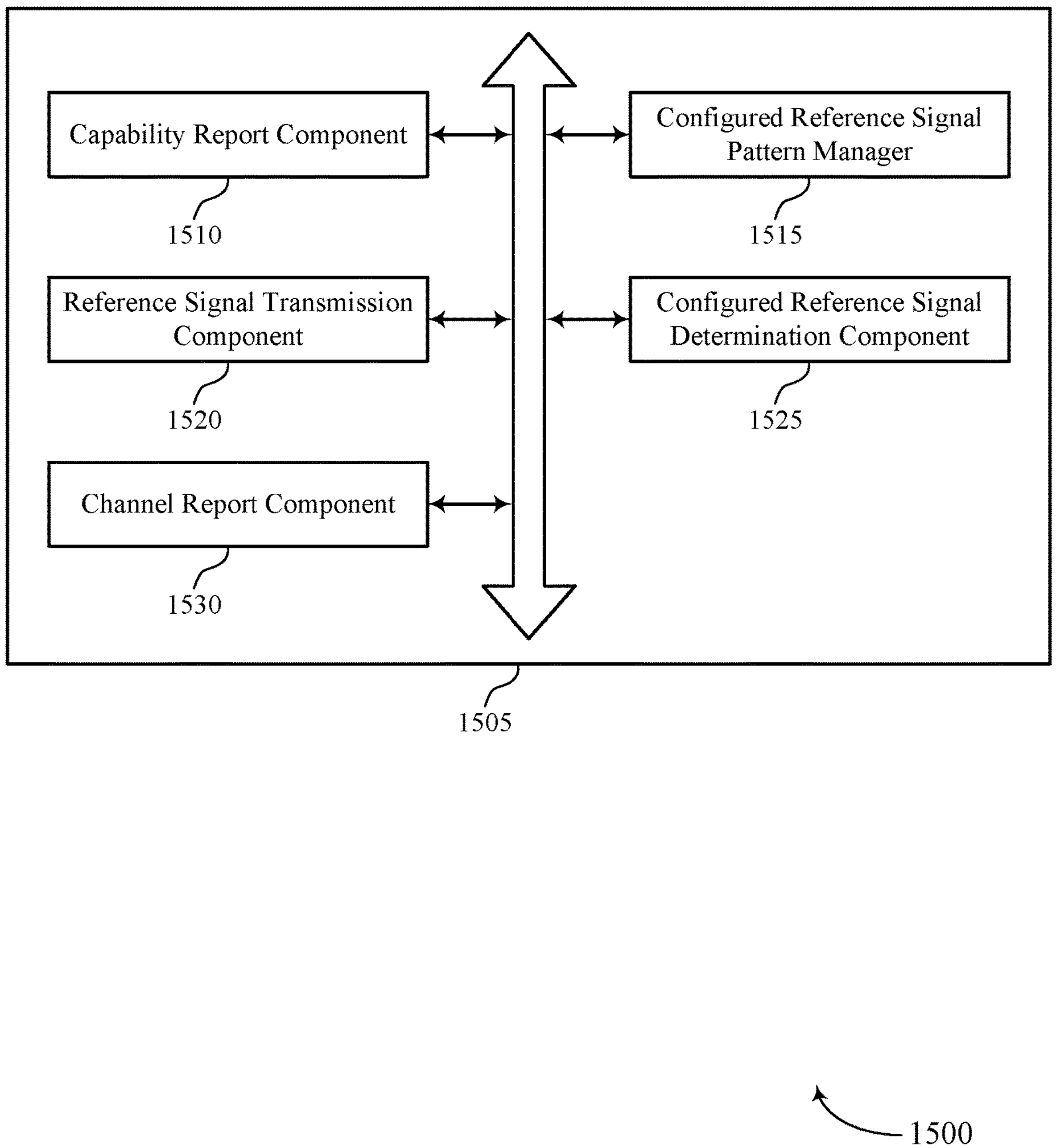
FIG. 15 shows a block diagram of a communications manager that supports reference signals for narrowband communications in accordance with aspects of the present disclosure.

FIG. 15 shows a block diagram 1500 of a communications manager 1505 that supports reference signals for narrowband communications in accordance with aspects of the present disclosure. The communications manager 1505 may be an example of aspects of a communications manager 1315, a communications manager 1415, or a communications manager 1610 described herein. The communications manager 1505 may include a capability report component 1510, a configured reference signal pattern manager 1515, a reference signal transmission component 1520, a configured reference signal determination component 1525, and a channel report component 1530. Each of these modules may communicate, directly or indirectly, with one another (e.g., via one or more buses).

The capability report component 1510 may receive, from a UE, a capability report indicating a UE capability associated with a configurable reference signal pattern.

The configured reference signal pattern manager 1515 may transmit, to the UE, an indication of a configured reference signal pattern based on receiving the capability report. In some examples, the configured reference signal pattern manager 1515 may receive, from the UE, a request for a configurable reference signal pattern, where transmitting the indication of the configured reference signal pattern is based on the request. In some examples, the configured reference signal pattern manager 1515 may transmit, to the UE, DCI indicating a pattern of the second set of reference signals, where the second set of reference signals is configured to be transmitted based on the pattern.

In some examples, the configured reference signal pattern manager 1515 may transmit, to the UE, DCI including an indication that the second set of reference signals is present. In some examples, the configured reference signal pattern manager 1515 may transmit, to the UE, an indication that the second set of reference signals is disassociated with determining a RSRP or a RSRQ. In some examples, the configured reference signal pattern manager 1515 may transmit, to the UE, the indication of the configured reference signal pattern via one or more of RRC signaling, a MAC CE, or DCI.

In some cases, the configured reference signal pattern is based on a downlink transmission from the base station to the UE spanning one or more slots. In some cases, the downlink transmission is associated with a first frequency band different from a second frequency band associated with one or more previous downlink transmissions. In some cases, the second set of reference signals is configured to be transmitted over a first number of slots at a beginning of the downlink transmission. In some cases, the first number of slots follow an uplink transmission including an uplink report or a time-division duplexed transmission. In some cases, the first number of slots follow a subframe reserved for uplink transmissions in a time-division duplexed frame structure. In some cases, the second set of reference signals is configured to be transmitted over a first number of slots at a beginning of the downlink transmission and over a second number of slots at an end of the downlink transmission.

In some cases, a channel of the downlink transmission is rate matched around the second set of reference signals. In some cases, a channel of the downlink transmission is punctured by the second set of reference signals. In some cases, a channel of the downlink transmission is rate matched by the first set of reference signals. In some cases, the configured reference signal pattern is based on a channel type associated with the downlink transmission. In some cases, the configured reference signal pattern is based on a transmission configuration of an uplink transmission spanning one or more slots, the second set of reference signals configured to be transmitted during a gap in the uplink transmission.

In some cases, the second set of reference signals is configured to be transmitted over each resource block of a frequency band associated with a transmission assigned to the UE. In some cases, the second set of reference signals is configured to be transmitted over resource blocks assigned to the UE. In some cases, the second set of reference signals is configured to be transmitted over resource blocks between any two assigned resource blocks. In some cases, the second set of reference signals is configured to be transmitted for every transmission of a channel assigned to the UE. In some cases, the second set of reference signals is configured to be transmitted for every transmission of a channel scheduled from a USS. In some cases, the second set of reference signals is configured to be transmitted over a time period based on one or more of a modulation coding scheme, a number of repetitions of a channel, or a frequency hopping pattern.

In some cases, the second set of reference signals is configured to have an EPRE based on the configured reference signal pattern, is dynamically configured by the base station to have an EPRE based on signaling from the base station, or is configured to have a same EPRE as the first set of reference signals. In some cases, the second set of reference signals is configured to have a same sequence as the first set of reference signals or a different sequence from the first set of reference signals. In some cases, the second set of reference signals is configured to be transmitted over all antenna ports associated with the first set of reference signals or a subset of the antenna ports associated with the first set of reference signals.

In some cases, the second set of reference signals includes one or more of CRSs, DMRSs, or reference signals transmitted over ports associated with CRSs. In some cases, the configured reference signal pattern is based on one or more reference signals associated with a system information block in a same frequency band as the second set of reference signals. In some cases, the second set of reference signals is configured to puncture a downlink channel or be dropped by the UE if the second set of reference signals collide with one or more transmissions of the downlink channel. In some cases, a downlink channel is configured to puncture the second set of reference signals or be dropped by the UE if the second set of reference signals collide with one or more transmissions of the downlink channel.

The reference signal transmission component 1520 may transmit, to the UE, a first set of reference signals associated with a baseline reference signal pattern and a second set of reference signals associated with the configured reference signal pattern.

The configured reference signal determination component 1525 may identify one or more network conditions including a low SNR regime, a high doppler regime, or a frequency hop associated with a downlink transmission to the UE. In some examples, the configured reference signal determination component 1525 may determine the configured reference signal pattern based on the one or more network conditions.

The channel report component 1530 may receive, from the UE, a channel report based on transmitting the first set of reference signals and the second set of reference signals. In some cases, the second set of reference signals is used to determine a RSRP or a RSRQ.

Figure 16:
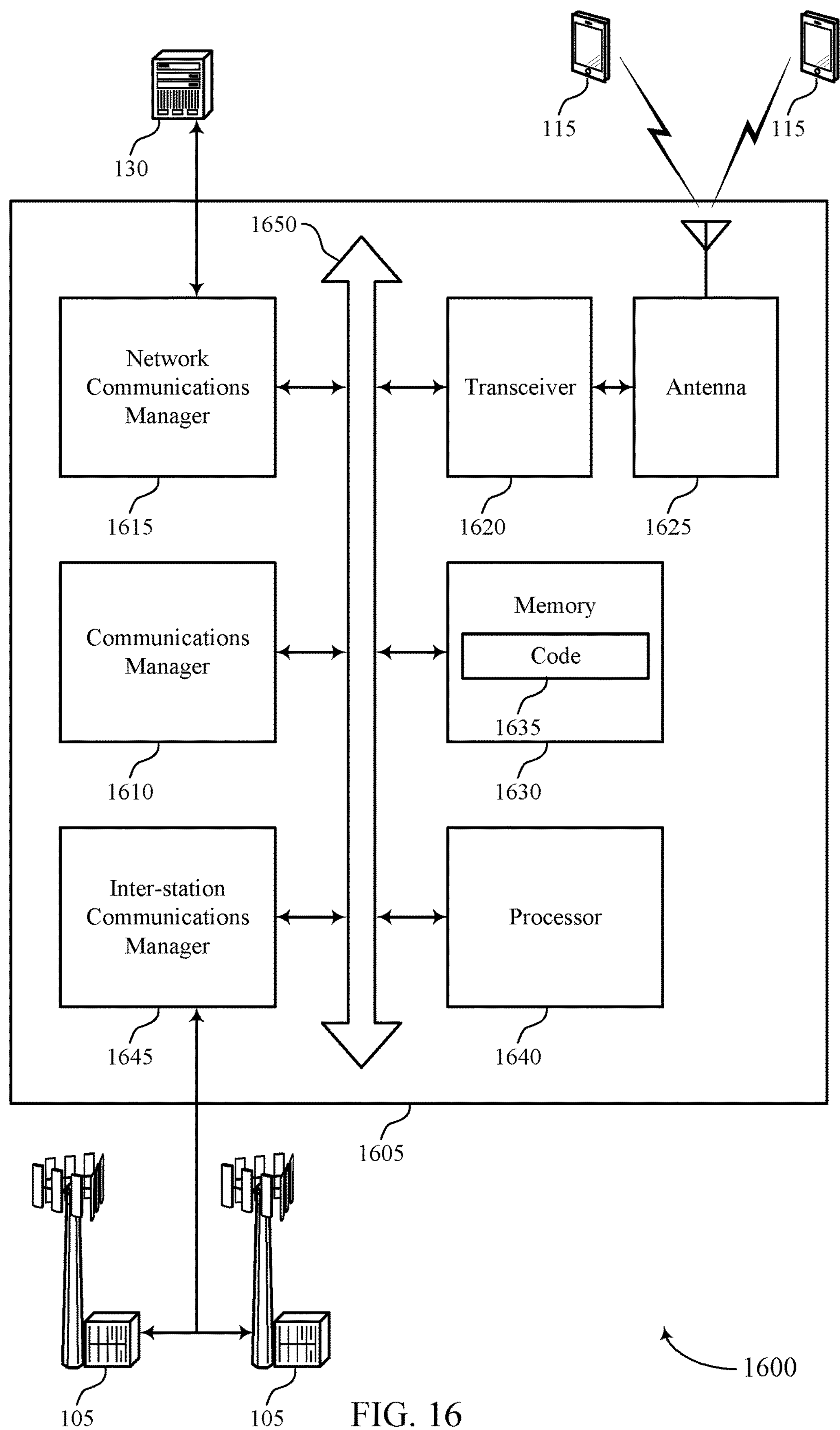
FIG. 16 shows a diagram of a system including a device that supports reference signals for narrowband communications in accordance with aspects of the present disclosure.

FIG. 16 shows a diagram of a system 1600 including a device 1605 that supports reference signals for narrowband communications in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may receive, from a UE, a capability report indicating a UE capability associated with a configurable reference signal pattern, transmit, to the UE, an indication of a configured reference signal pattern based on receiving the capability report, and transmit, to the UE, a first set of reference signals associated with a baseline reference signal pattern and a second set of reference signals associated with the configured reference signal pattern.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting reference signals for narrowband communications).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
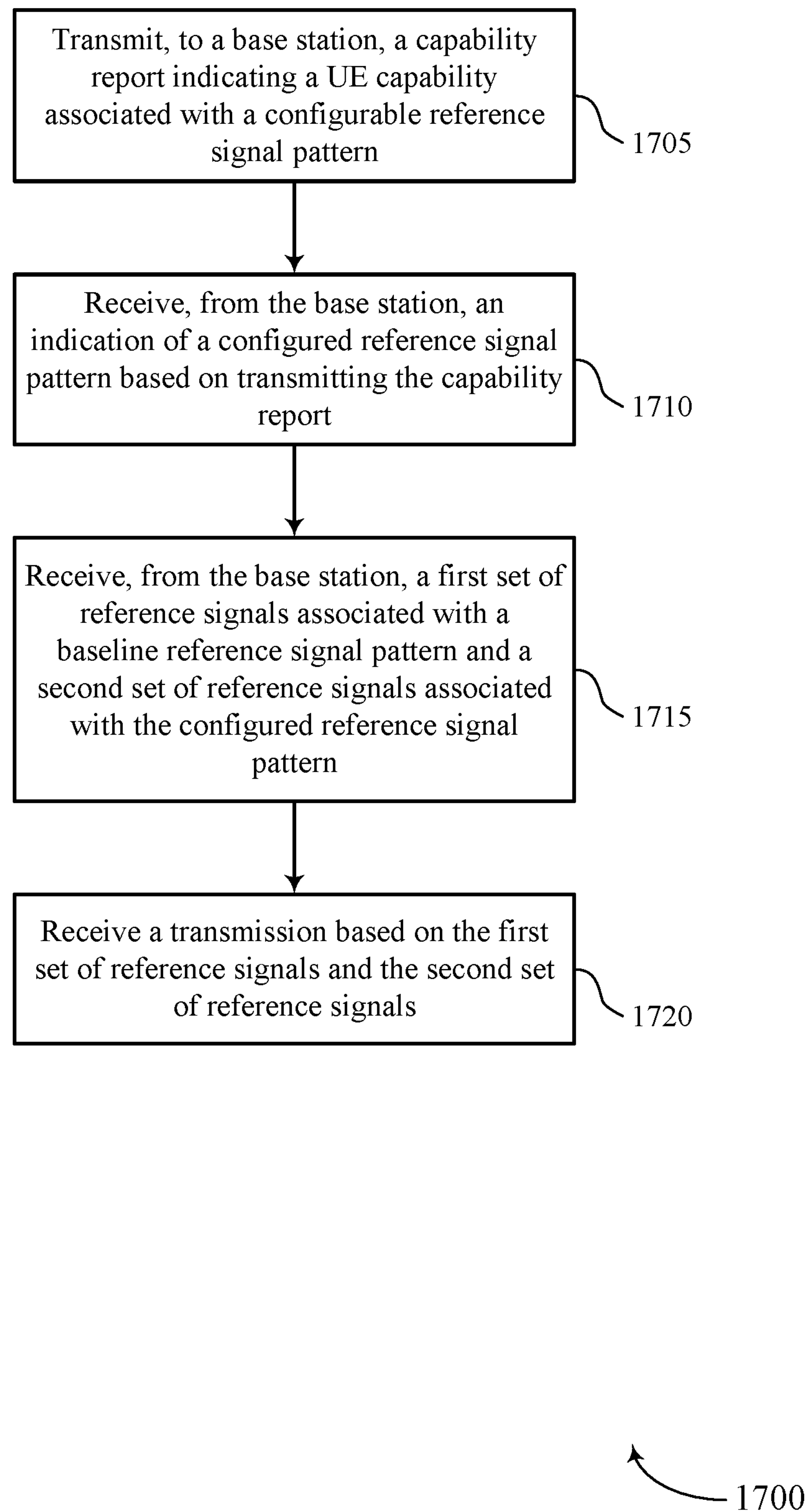
FIGS. 17 through 21 show flowcharts illustrating methods that support reference signals for narrowband communications in accordance with aspects of the present disclosure.

FIG. 17 shows a flowchart illustrating a method 1700 that supports reference signals for narrowband communications in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may transmit, to a base station, a capability report indicating a UE capability associated with a configurable reference signal pattern. The operations of 1705 may be performed according to the methods described herein. In some examples, aspects of the operations of 1705 may be performed by an UE capability component as described with reference to FIGS. 9 through 12.

At 1710, the UE may receive, from the base station, an indication of a configured reference signal pattern based on transmitting the capability report. The operations of 1710 may be performed according to the methods described herein. In some examples, aspects of the operations of 1710 may be performed by a configured reference signal pattern component as described with reference to FIGS. 9 through 12.

At 1715, the UE may receive, from the base station, a first set of reference signals associated with a baseline reference signal pattern and a second set of reference signals associated with the configured reference signal pattern. The operations of 1715 may be performed according to the methods described herein. In some examples, aspects of the operations of 1715 may be performed by a reference signal reception component as described with reference to FIGS. 9 through 12.

At 1720, the UE may receive a transmission based on the first set of reference signals and the second set of reference signals. The operations of 1720 may be performed according to the methods described herein. In some examples, aspects of the operations of 1720 may be performed by a channel estimation component as described with reference to FIGS. 9 through 12.

Figure 18:
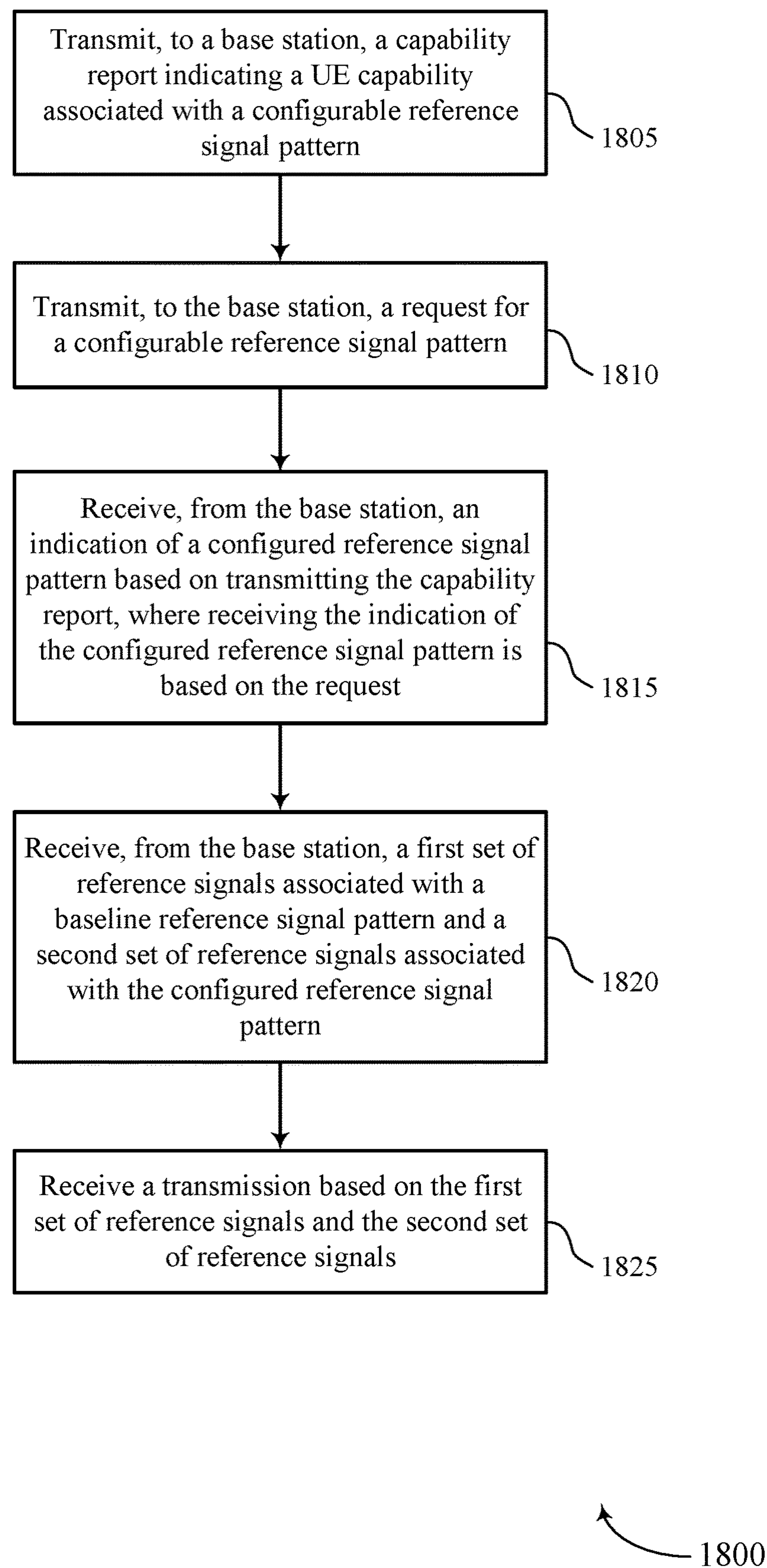

FIG. 18 shows a flowchart illustrating a method 1800 that supports reference signals for narrowband communications in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may transmit, to a base station, a capability report indicating a UE capability associated with a configurable reference signal pattern. The operations of 1805 may be performed according to the methods described herein. In some examples, aspects of the operations of 1805 may be performed by an UE capability component as described with reference to FIGS. 9 through 12.

At 1810, the UE may transmit, to the base station, a request for a configurable reference signal pattern, where receiving the indication of the configured reference signal pattern is based on the request. The operations of 1810 may be performed according to the methods described herein. In some examples, aspects of the operations of 1810 may be performed by a request component as described with reference to FIGS. 9 through 12.

At 1815, the UE may receive, from the base station, an indication of a configured reference signal pattern based on transmitting the capability report. The operations of 1815 may be performed according to the methods described herein. In some examples, aspects of the operations of 1815 may be performed by a configured reference signal pattern component as described with reference to FIGS. 9 through 12.

At 1820, the UE may receive, from the base station, a first set of reference signals associated with a baseline reference signal pattern and a second set of reference signals associated with the configured reference signal pattern. The operations of 1820 may be performed according to the methods described herein. In some examples, aspects of the operations of 1820 may be performed by a reference signal reception component as described with reference to FIGS. 9 through 12.

At 1825, the UE may receive a transmission based on the first set of reference signals and the second set of reference signals. The operations of 1825 may be performed according to the methods described herein. In some examples, aspects of the operations of 1825 may be performed by a channel estimation component as described with reference to FIGS. 9 through 12.

Figure 19:
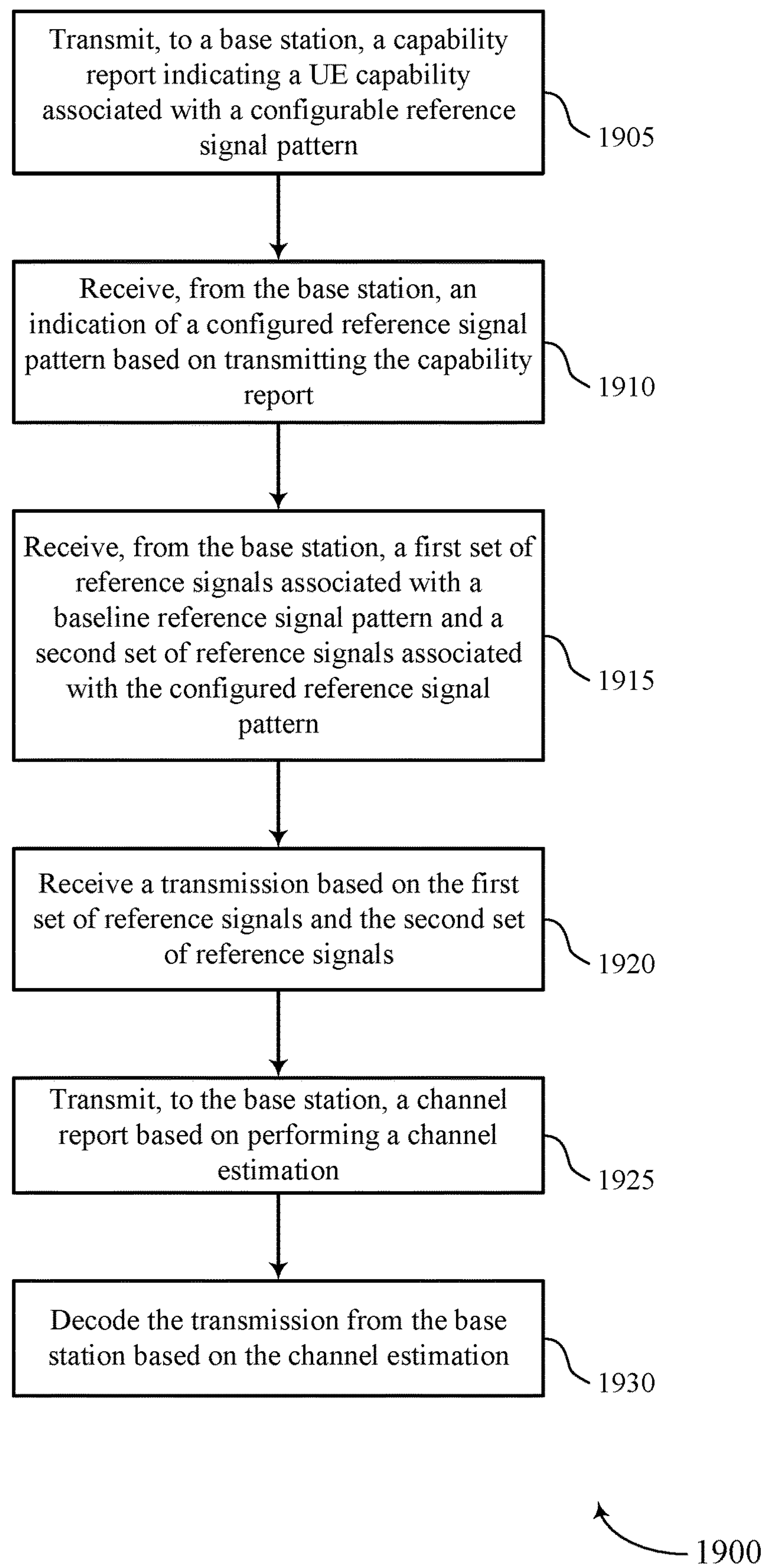

FIG. 19 shows a flowchart illustrating a method 1900 that supports reference signals for narrowband communications in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may transmit, to a base station, a capability report indicating a UE capability associated with a configurable reference signal pattern. The operations of 1905 may be performed according to the methods described herein. In some examples, aspects of the operations of 1905 may be performed by an UE capability component as described with reference to FIGS. 9 through 12.

At 1910, the UE may receive, from the base station, an indication of a configured reference signal pattern based on transmitting the capability report. The operations of 1910 may be performed according to the methods described herein. In some examples, aspects of the operations of 1910 may be performed by a configured reference signal pattern component as described with reference to FIGS. 9 through 12.

At 1915, the UE may receive, from the base station, a first set of reference signals associated with a baseline reference signal pattern and a second set of reference signals associated with the configured reference signal pattern. The operations of 1915 may be performed according to the methods described herein. In some examples, aspects of the operations of 1915 may be performed by a reference signal reception component as described with reference to FIGS. 9 through 12.

At 1920, the UE may receive a transmission based on the first set of reference signals and the second set of reference signals. The operations of 1920 may be performed according to the methods described herein. In some examples, aspects of the operations of 1920 may be performed by a channel estimation component as described with reference to FIGS. 9 through 12.

At 1925, the UE may transmit, to the base station, a channel report based on performing a channel estimation. The operations of 1925 may be performed according to the methods described herein. In some examples, aspects of the operations of 1925 may be performed by a channel estimation component as described with reference to FIGS. 9 through 12.

At 1930, the UE may decode a transmission from the base station based on the channel estimation. The operations of 1930 may be performed according to the methods described herein. In some examples, aspects of the operations of 1930 may be performed by a channel estimation component as described with reference to FIGS. 9 through 12.

Figure 20:
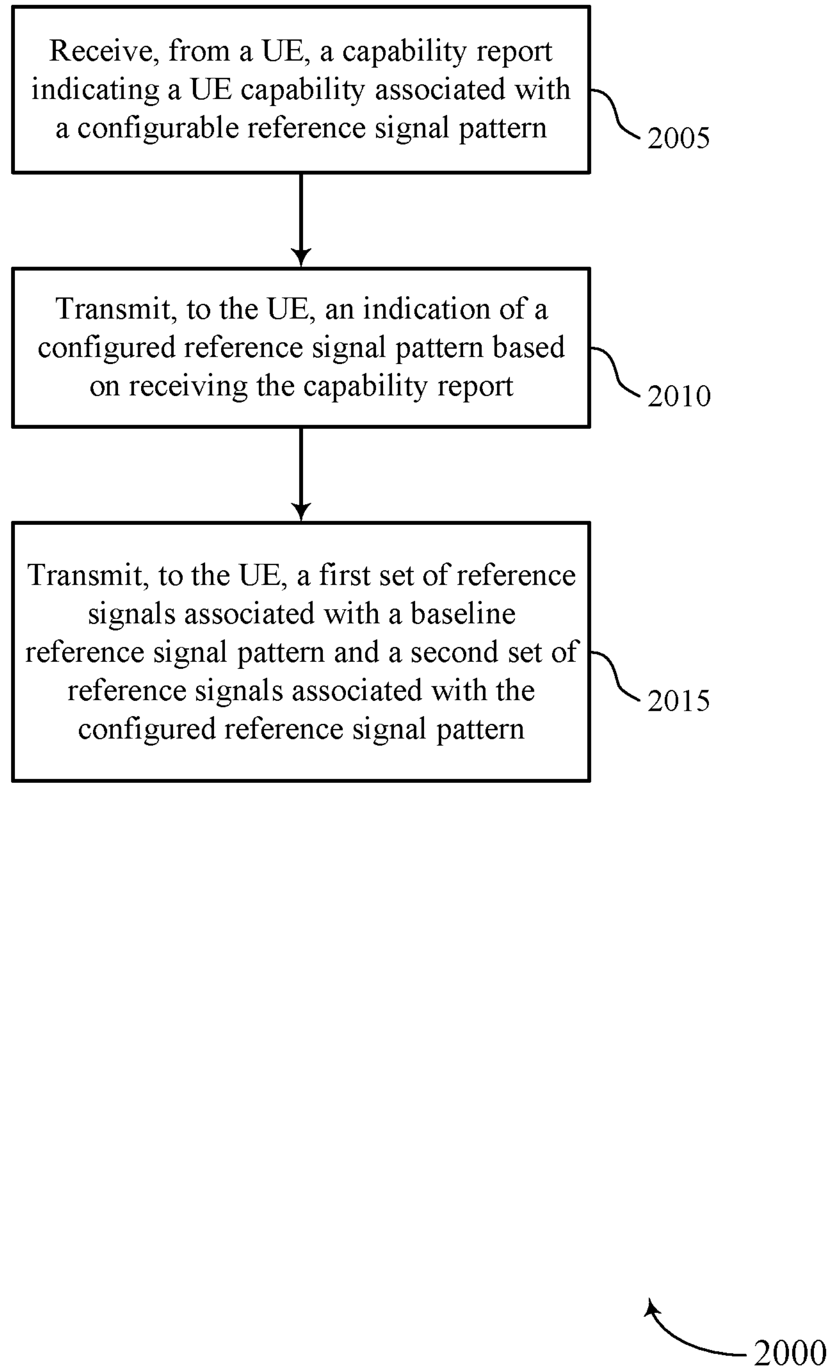

FIG. 20 shows a flowchart illustrating a method 2000 that supports reference signals for narrowband communications in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may receive, from a UE, a capability report indicating a UE capability associated with a configurable reference signal pattern. The operations of 2005 may be performed according to the methods described herein. In some examples, aspects of the operations of 2005 may be performed by a capability report component as described with reference to FIGS. 13 through 16.

At 2010, the base station may transmit, to the UE, an indication of a configured reference signal pattern based on receiving the capability report. The operations of 2010 may be performed according to the methods described herein. In some examples, aspects of the operations of 2010 may be performed by a configured reference signal pattern manager as described with reference to FIGS. 13 through 16.

At 2015, the base station may transmit, to the UE, a first set of reference signals associated with a baseline reference signal pattern and a second set of reference signals associated with the configured reference signal pattern. The operations of 2015 may be performed according to the methods described herein. In some examples, aspects of the operations of 2015 may be performed by a reference signal transmission component as described with reference to FIGS. 13 through 16.

Figure 21:
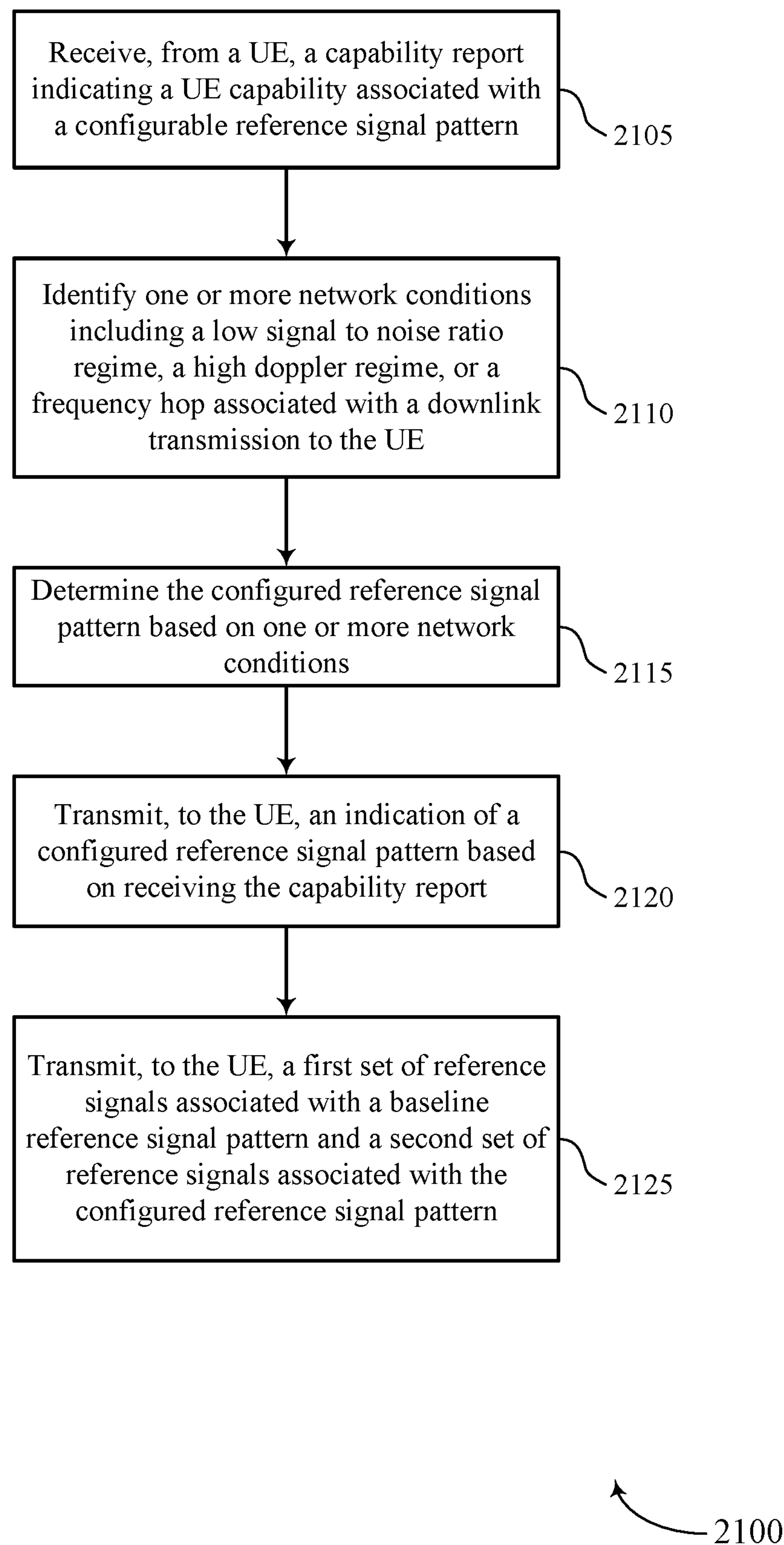

FIG. 21 shows a flowchart illustrating a method 2100 that supports reference signals for narrowband communications in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may receive, from a UE, a capability report indicating a UE capability associated with a configurable reference signal pattern. The operations of 2105 may be performed according to the methods described herein. In some examples, aspects of the operations of 2105 may be performed by a capability report component as described with reference to FIGS. 13 through 16.

At 2110, the base station may identify one or more network conditions including a low SNR regime, a high doppler regime, or a frequency hop associated with a downlink transmission to the UE. The operations of 2110 may be performed according to the methods described herein. In some examples, aspects of the operations of 2110 may be performed by a configured reference signal determination component as described with reference to FIGS. 13 through 16.

At 2115, the base station may determine the configured reference signal pattern based on the one or more network conditions. The operations of 2115 may be performed according to the methods described herein. In some examples, aspects of the operations of 2115 may be performed by a configured reference signal determination component as described with reference to FIGS. 13 through 16.

At 2120, the base station may transmit, to the UE, an indication of a configured reference signal pattern based on receiving the capability report. The operations of 2120 may be performed according to the methods described herein. In some examples, aspects of the operations of 2120 may be performed by a configured reference signal pattern manager as described with reference to FIGS. 13 through 16.

At 2125, the base station may transmit, to the UE, a first set of reference signals associated with a baseline reference signal pattern and a second set of reference signals associated with the configured reference signal pattern. The operations of 2125 may be performed according to the methods described herein. In some examples, aspects of the operations of 2125 may be performed by a reference signal transmission component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

transmitting, to an access network entity, a capability report indicating a UE capability associated with a configurable reference signal pattern;

receiving, from the access network entity, an indication of a configured reference signal pattern based at least in part on transmitting the capability report, wherein the configured reference signal pattern is based at least in part on a channel type associated with a downlink transmission;

receiving, from the access network entity, a first set of reference signals associated with a baseline reference signal pattern and a second set of reference signals associated with the configured reference signal pattern; and receiving, from the access network entity, the downlink transmission based at least in part on the first set of reference signals and the second set of reference signals.

2. The method of claim 1, further comprising:

transmitting, to the access network entity, a request for the configured reference signal pattern, wherein receiving the indication of the configured reference signal pattern is based at least in part on the request; and determining that the downlink transmission associated with the first set of reference signals is associated with one or more of a low signal to noise ratio regime, a high doppler regime, or a frequency hop, wherein transmitting the request to the access network entity is based at least in part on the determining.

3. The method of claim 1, further comprising:

transmitting, to the access network entity, a channel report based at least in part on the first set of reference signals and the second set of reference signals; or decoding the downlink transmission from the access network entity based at least in part on a channel estimation based on the first set of reference signals and the second set of reference signals.

4. The method of claim 1, wherein the configured reference signal pattern is based at least in part on the downlink transmission from the access network entity to the UE spanning one or more slots.

5. The method of claim 4, wherein the downlink transmission is associated with a first frequency band different from a second frequency band associated with one or more previous downlink transmissions.

6. The method of claim 4, wherein the second set of reference signals is configured to be received over a first number of slots at a beginning of the downlink transmission.

7. The method of claim 6, wherein the first number of slots follow an uplink transmission comprising an uplink report or a time-division duplexed transmission.

8. The method of claim 6, wherein the first number of slots follow a subframe reserved for uplink transmissions in a time-division duplexed frame structure.

9. The method of claim 4, wherein the second set of reference signals is configured to be received over a first number of slots at a beginning of the downlink transmission and over a second number of slots at an end of the downlink transmission.

10. The method of claim 4, wherein a channel of the downlink transmission is rate matched around the second set of reference signals.

11. The method of claim 4, wherein a channel of the downlink transmission is punctured by the second set of reference signals and rate matched by the first set of reference signals.

12. The method of claim 1, wherein the configured reference signal pattern is based at least in part on a transmission configuration of an uplink transmission spanning one or more slots, the second set of reference signals configured to be received during a gap in the uplink transmission.

13. The method of claim 1, wherein the second set of reference signals is configured to be received over each resource block of a frequency band associated with the downlink transmission assigned to the UE.

14. The method of claim 1, wherein the second set of reference signals is configured to be received over resource blocks assigned to the UE or between any two resource blocks assigned to the UE.

15. The method of claim 1, wherein the second set of reference signals is configured to be received for every transmission of a channel assigned to the UE.

16. The method of claim 1, wherein the second set of reference signals is configured to be received for every transmission of a channel scheduled from a UE-specific search space.

17. The method of claim 1, wherein the second set of reference signals is configured to be received over a time period based on one or more of a modulation coding scheme, a number of repetitions of a channel, or a frequency hopping pattern.

18. The method of claim 1, further comprising:
 receiving, from the access network entity, downlink control information comprising an indication that the second set of reference signals is present and indicating a pattern of the second set of reference signals, wherein the second set of reference signals is configured to be received based at least in part on the pattern.

19. The method of claim 1, wherein the second set of reference signals is configured to have an energy per resource element based on the configured reference signal pattern, is dynamically configured to have an energy per resource element based on signaling from the access network entity, or is configured to have a same energy per resource element as the first set of reference signals.

20. The method of claim 1, wherein the second set of reference signals is configured to puncture a downlink channel or be dropped by the UE if the second set of reference signals collide with one or more transmissions of the downlink channel.

21. The method of claim 1, wherein a downlink channel is configured to puncture the second set of reference signals or be dropped by the UE if the second set of reference signals collide with one or more transmissions of the downlink channel.

22. The method of claim 1, further comprising:
 receiving, from the access network entity, the indication of the configured reference signal pattern via one or more of radio resource control signaling, a medium access control element, or downlink control information.

23. A method for wireless communication at an access network entity, comprising:
 receiving, from a user equipment (UE), a capability report indicating a UE capability associated with a configurable reference signal pattern;
 transmitting, to the UE, an indication of a configured reference signal pattern based at least in part on receiving the capability report, wherein the configured reference signal pattern is based at least in part on a channel type associated with a downlink transmission; and
 transmitting, to the UE, a first set of reference signals associated with a baseline reference signal pattern and a second set of reference signals associated with the configured reference signal pattern.

24. The method of claim 23, wherein the configured reference signal pattern is based at least in part on the downlink transmission from the access network entity to the UE spanning one or more slots.

25. An apparatus for wireless communication at a user equipment (UE), comprising:
 at least one processor; and
 memory coupled with the at least one processor,
 the memory storing instructions executable by the at least one processor to cause the UE to:
  transmit, to an access network entity, a capability report indicating a UE capability associated with a configurable reference signal pattern;
  receive, from the access network entity, an indication of a configured reference signal pattern based at least in part on transmitting the capability report, wherein the configured reference signal pattern is based at least in part on a channel type associated with a downlink transmission;
  receive, from the access network entity, a first set of reference signals associated with a baseline reference signal pattern and a second set of reference signals associated with the configured reference signal pattern; and
  receive, from the access network entity, the downlink transmission based at least in part on the first set of reference signals and the second set of reference signals.

26. The apparatus of claim 25, wherein the instructions are further executable by the at least one processor to cause the UE to:
 transmit, to the access network entity, a request for the configured reference signal pattern, wherein receiving the indication of the configured reference signal pattern is based at least in part on the request; and
 determine that the downlink transmission associated with the first set of reference signals is associated with one or more of a low signal to noise ratio regime, a high doppler regime, or a frequency hop, wherein transmitting the request to the access network entity is based at least in part on the determining.

27. The apparatus of claim 25, wherein the instructions are further executable by the at least one processor to cause the UE to:

transmit, to the access network entity, a channel report based at least in part on the first set of reference signals and the second set of reference signals; or decode the downlink transmission from the access network entity based at least in part on a channel estimation based on the first set of reference signals and the second set of reference signals.

28. The apparatus of claim 25, wherein the configured reference signal pattern is based at least in part on the downlink transmission from the access network entity to the UE spanning one or more slots.

29. An apparatus for wireless communication at an access network entity, comprising:

at least one processor; and memory coupled with the at least one processor, the memory storing instructions executable by the at least one processor to cause the UE to:

receive, from a user equipment (UE), a capability report indicating a UE capability associated with a configurable reference signal pattern;

transmit, to the UE, an indication of a configured reference signal pattern based at least in part on receiving the capability report, wherein the configured reference signal pattern is based at least in part on a channel type associated with a downlink transmission; and transmit, to the UE, a first set of reference signals associated with a baseline reference signal pattern and a second set of reference signals associated with the configured reference signal pattern.

* * * * *